US009253291B2

(12) United States Patent
Tandra et al.

(10) Patent No.: US 9,253,291 B2
(45) Date of Patent: Feb. 2, 2016

(54) SYSTEMS AND METHODS FOR WIRELESS COMMUNICATION

(71) Applicant: QUALCOMM Incorporated, San Diego, CA (US)

(72) Inventors: Rahul Tandra, San Diego, CA (US); Gwendolyn Denise Barriac, San Diego, CA (US); Sameer Vermani, San Diego, CA (US); Hemanth Sampath, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 85 days.

(21) Appl. No.: 14/024,457

(22) Filed: Sep. 11, 2013

(65) Prior Publication Data

US 2014/0078920 A1    Mar. 20, 2014

Related U.S. Application Data

(60) Provisional application No. 61/701,542, filed on Sep. 14, 2012.

(51) Int. Cl.
| | |
|---|---|
| *H04L 29/06* | (2006.01) |
| *H04L 25/02* | (2006.01) |
| *H04L 25/03* | (2006.01) |
| *H04L 27/26* | (2006.01) |

(52) U.S. Cl.
CPC .............. *H04L 69/08* (2013.01); *H04L 25/022* (2013.01); *H04L 25/03159* (2013.01); *H04L 25/03891* (2013.01); *H04L 27/265* (2013.01); *H04L 27/2607* (2013.01)

(58) Field of Classification Search
CPC ....................................................... H04L 69/08
See application file for complete search history.

(56) References Cited

U.S. PATENT DOCUMENTS

| | | | |
|---|---|---|---|
| 7,991,079 B2 | 8/2011 | Mujtaba | |
| 8,023,597 B2 | 9/2011 | Du et al. | |
| 2003/0081538 A1* | 5/2003 | Walton et al. | 370/206 |
| 2006/0083211 A1* | 4/2006 | Laroia et al. | 370/343 |
| 2009/0122771 A1* | 5/2009 | Cai | 370/338 |
| 2013/0034032 A1 | 2/2013 | Vaere et al. | |

OTHER PUBLICATIONS

Wang Y., et al., "Cyclic Prefixed Single Carrier Transmission in Ultra-wideband Communications," IEEE Transactions on Wireless Communications, vol. 5 (8), Aug. 2006, pp. 2017-2021.

(Continued)

*Primary Examiner* — Hassan Kizou
*Assistant Examiner* — Ashil Farahmand
(74) *Attorney, Agent, or Firm* — Knobbe Martens Olson & Bear LLP

(57) ABSTRACT

Systems, methods, and devices for wireless communication. In one aspect, an apparatus for wireless communication is provided. The apparatus includes a receiver configured to receive a wireless signal comprising a packet. At least a portion of the wireless signal may be received over a channel with a channel bandwidth of at least approximately five hundred megahertz. The packet may be formed from at least one orthogonal frequency-division multiplexing (OFDM) symbol comprising at least one hundred and twenty-eight tones. The apparatus further comprises a processor configured to evaluate the wireless signal. The processor may comprise a transform module configured to convert the at least one OFDM symbol into a frequency domain signal.

34 Claims, 14 Drawing Sheets

(56) References Cited

OTHER PUBLICATIONS

Wylie-Green M.P., et al., "Multi-band OFDM UWB Solution for IEEE 802.15.3a WPANs," IEEE/Sarnoff Symposium on Advances in Wired and Wireless Communication, 2005, pp. 102-105.

International Search Report and Written Opinion—PCT/US2013/059508—ISA/EPO—Feb. 7, 2014.

Salazar, J., et al., "Adaptive Resource Management and flexible Radios for WiMAX", Apr. 1, 2009, pp. 101-107, XP055099491, Retrieved from the Internet: URL:http://citeseerx.ist.psu.edu/viewdoc/download?doi=10.1.1.189.1567&rep=rep1&type=pdf [retrieved on Jan. 30, 2014), p. 101-p. 103; table 1.

Tonello, A.M., et al., "Bit, tone and cyclic prefix allocation in OFDM with application to In-Home PLC", Wireless Days, 2008. WD '08. 1st IFIP, IEEE, Piscatway, NJ, USA, Nov. 24, 2008, pp. 1-5, XP031448093, ISBN: 978-1-4244-2828-1, p. 4-p. 5.

Standard ECMA-368: "High Rate Ultra Wideband PHY and MAC Standard", ECMA International, Dec. 1, 2005, 1st Edition, pp. 1-312.

* cited by examiner

| FFT Sizing Option 1 | | | |
|---|---|---|---|
| Channel BW (MHz) | FFT Size | CP Duration (25% overhead) | OFDM Symbol Time (ns) |
| 500 | 256 | 128 ns | 640 |
| 1000 | 512 | 128 ns | 640 |
| 2000 | 1024 | 128 ns | 640 |

| FFT Sizing Option 2 | | | |
|---|---|---|---|
| Channel BW (MHz) | FFT Size | CP Duration (12.5% overhead) | OFDM Symbol Time (ns) |
| 500 | 512 | 128 ns | 1152 |
| 1000 | 1024 | 128 ns | 1152 |
| 2000 | 2048 | 128 ns | 1152 |

| FFT Sizing Option 3 | | | |
|---|---|---|---|
| Channel BW (MHz) | FFT Size | CP Duration (25% overhead) | OFDM Symbol Time (ns) |
| 500 | 128 | 64 ns | 320 |
| 1000 | 256 | 64 ns | 320 |
| 2000 | 512 | 64 ns | 320 |

| FFT Sizing Option 1 | | | |
|---|---|---|---|
| Channel BW (MHz) | FFT Size | CP Duration (25% overhead) | OFDM Symbol Time (ns) |
| 500 | 256 | 128 ns | 640 |
| 1000 | 512 | 128 - x ns | 640 - x |
| 2000 | 1024 | 128 – (x + x/2) ns | 640 – (x + x/2) |

854

| FFT Sizing Option 2 | | | |
|---|---|---|---|
| Channel BW (MHz) | FFT Size | CP Duration (12.5% overhead) | OFDM Symbol Time (ns) |
| 500 | 512 | 128 ns | 1152 |
| 1000 | 1024 | 128 - x ns | 1152 - x |
| 2000 | 2048 | 128 – (x + x/2) ns | 1152 – (x + x/2) |

856

| FFT Sizing Option 3 | | | |
|---|---|---|---|
| Channel BW (MHz) | FFT Size | CP Duration (25% overhead) | OFDM Symbol Time (ns) |
| 500 | 128 | 64 ns | 320 |
| 1000 | 256 | 64 - x ns | 320 - x |
| 2000 | 512 | 64 – (x + x/2) ns | 320 – (x + x/2) |

FIG. 8B

SYSTEMS AND METHODS FOR WIRELESS COMMUNICATION

CROSS-REFERENCE TO RELATED APPLICATIONS

This application claims priority under 35 U.S.C. §119(e) to U.S. Provisional Patent Application No. 61/701,542, entitled "SYSTEMS AND METHODS FOR WIRELESS COMMUNICATION" and filed on Sep. 14, 2012, the entire contents of which disclosure is herewith incorporated by reference.

BACKGROUND

1. Field

The present application relates generally to wireless communications, and more specifically to systems, methods, and devices to enable wireless communication in 6 to 9 gigahertz bands.

2. Background

In many telecommunication systems, communications networks are used to exchange messages among several interacting spatially-separated devices. Networks may be classified according to geographic scope, which could be, for example, a metropolitan area, a local area, or a personal area. Such networks may be designated respectively as a wide area network (WAN), metropolitan area network (MAN), local area network (LAN), or personal area network (PAN). Networks also differ according to the switching/routing technique used to interconnect the various network nodes and devices (e.g., circuit switching vs. packet switching), the type of physical media employed for transmission (e.g., wired vs. wireless), and the set of communication protocols used (e.g., Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

The devices in a wireless network may transmit/receive information between each other. The information may comprise packets, which in some aspects may be referred to as data units. The packets may include overhead information (e.g., header information, packet properties, etc.) that helps in routing the packet through the network, identifying the data in the packet, processing the packet, etc., as well as data, for example user data, multimedia content, etc. as might be carried in a payload of the packet.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the features of this invention provide advantages that include providing wireless communication in sub-gigahertz bands for low power and long distance wireless communications.

One aspect of the disclosure provides an apparatus for wireless communication. The apparatus comprises a receiver configured to receive a wireless signal comprising a packet. At least a portion of the wireless signal may be received over a channel with a channel bandwidth of at least approximately five hundred megahertz. The packet may be formed from at least one orthogonal frequency-division multiplexing (OFDM) symbol comprising at least one hundred and twenty-eight tones. The packet may further include a cyclic prefix. A duration of the cyclic prefix may be a function of the channel bandwidth and is set such that the duration of the cyclic prefix is greater than a delay spread of the channel and delay introduced by front-end processing. The apparatus further comprises a processor configured to evaluate the wireless signal. The processor may comprise a transform module configured to convert the at least one OFDM symbol into a frequency domain signal.

Another aspect of the disclosure provides a method for wireless communication. The method comprises receiving a wireless signal comprising a packet. At least a portion of the wireless signal may be received over a channel with a channel bandwidth of at least approximately five hundred megahertz. The packet may be formed from at least one orthogonal frequency-division multiplexing (OFDM) symbol comprising at least one hundred and twenty-eight tones. The packet may further include a cyclic prefix. A duration of the cyclic prefix may be a function of the channel bandwidth and is set such that the duration of the cyclic prefix is greater than a delay spread of the channel and delay introduced by front-end processing. The method further comprises evaluating the wireless signal. The evaluating may comprise converting the at least one OFDM symbol into a frequency domain signal.

Another aspect of the disclosure provides an apparatus for wireless communication. The apparatus comprises means for receiving a wireless signal comprising a packet. At least a portion of the wireless signal may be received over a channel with a channel bandwidth of at least approximately five hundred megahertz. The packet may be formed from at least one orthogonal frequency-division multiplexing (OFDM) symbol comprising at least one hundred and twenty-eight tones. The packet may further include a cyclic prefix. A duration of the cyclic prefix may be a function of the channel bandwidth and is set such that the duration of the cyclic prefix is greater than a delay spread of the channel and delay introduced by front-end processing. The apparatus further comprises means for evaluating the wireless signal. The means for evaluating the wireless signal may comprise means for converting the at least one OFDM symbol into a frequency domain signal.

Another aspect of the disclosure provides a non-transitory computer-readable medium comprising code that, when executed, causes an apparatus to receive a wireless signal comprising a packet. At least a portion of the wireless signal may be received over a channel with a channel bandwidth of at least approximately five hundred megahertz. The packet is formed from at least one orthogonal frequency-division multiplexing (OFDM) symbol comprising at least one hundred and twenty-eight tones. The packet may further include a cyclic prefix. A duration of the cyclic prefix may be a function of the channel bandwidth and is set such that the duration of the cyclic prefix is greater than a delay spread of the channel and delay introduced by front-end processing. The medium further comprises code that, when executed, causes an apparatus to convert the at least one OFDM symbol into a frequency domain signal.

Another aspect of the disclosure provides an apparatus for wireless communication. The apparatus comprises a processor configured to generate a packet for transmission via a wireless signal. The packet may be generated for transmission using at least one orthogonal frequency-division multiplexing (OFDM) symbol comprising at least one hundred and twenty-eight tones. The apparatus further comprises a transmitter configured to transmit the packet via the wireless signal over a channel with a channel bandwidth of at least approximately five hundred megahertz. The packet may further include a cyclic prefix. A duration of the cyclic prefix may be a function of the channel bandwidth and is set such that the duration of the cyclic prefix is greater than a delay spread of the channel and delay introduced by front-end processing.

Another aspect of the disclosure provides a method for wireless communication. The method comprises generating a packet for transmission via a wireless signal. The generating the packet may comprise generating the packet for transmission using at least one orthogonal frequency-division multiplexing (OFDM) symbol comprising at least one hundred and twenty-eight tones. The method further comprises transmitting the packet via the wireless signal over a channel with a channel bandwidth of at least approximately five hundred megahertz. The packet may further include a cyclic prefix. A duration of the cyclic prefix may be a function of the channel bandwidth and is set such that the duration of the cyclic prefix is greater than a delay spread of the channel and delay introduced by front-end processing.

Another aspect of the disclosure provides an apparatus for wireless communication. The apparatus comprises means for generating a packet for transmission via a wireless signal. The means for generating the packet may comprise means for generating the packet for transmission using at least one orthogonal frequency-division multiplexing (OFDM) symbol comprising at least one hundred and twenty-eight tones. The apparatus further comprises means for transmitting the packet via the wireless signal over a channel with a channel bandwidth of at least approximately five hundred megahertz. The packet may further include a cyclic prefix. A duration of the cyclic prefix may be a function of the channel bandwidth and is set such that the duration of the cyclic prefix is greater than a delay spread of the channel and delay introduced by front-end processing.

Another aspect of the disclosure provides a non-transitory computer-readable medium comprising code that, when executed, causes an apparatus to generate a packet for transmission via a wireless signal. The packet may be generated for transmission using at least one orthogonal frequency-division multiplexing (OFDM) symbol comprising at least one hundred and twenty-eight tones. The medium further comprises code that, when executed, causes an apparatus to transmit the packet via the wireless signal over a channel with a channel bandwidth of at least approximately five hundred megahertz. The packet may further include a cyclic prefix. A duration of the cyclic prefix may be a function of the channel bandwidth and is set such that the duration of the cyclic prefix is greater than a delay spread of the channel and delay introduced by front-end processing.

BRIEF DESCRIPTION OF THE DRAWINGS

FIG. 8A is a diagram showing numerologies for transmission over a bandwidth of approximately 500 MHz, 1000 MHz, and 2000 MHz.

FIG. 8B is another diagram showing numerologies for transmission over a bandwidth of approximately 500 MHz, 1000 MHz, and 2000 MHz.

DETAILED DESCRIPTION

Figure 1:
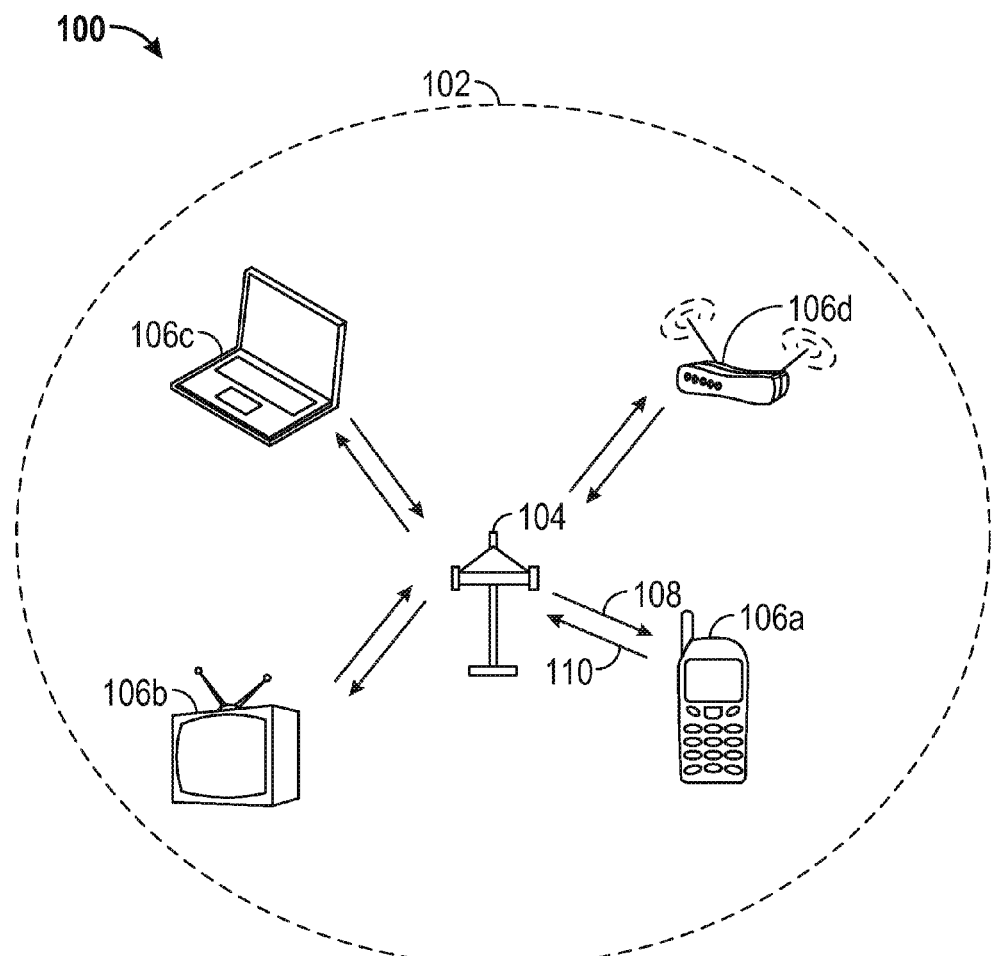
FIG. 1 illustrates an example of a wireless communication system in which aspects of the present disclosure may be employed.

Various aspects of the novel systems, apparatuses, and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Wireless network technologies may include various types of wireless local area networks (WLANs). A WLAN may be used to interconnect nearby devices together, employing widely used networking protocols. The various aspects described herein may apply to any communication standard, such as WiFi or, more generally, any member of the IEEE 802.11 family of wireless protocols. For example, the various aspects described herein may be used as part of a wireless protocol that uses 6 to 9 GHz bands.

In some aspects, wireless signals in a six to nine gigahertz band may be transmitted using orthogonal frequency-division multiplexing (OFDM), direct-sequence spread spectrum (DSSS) communications, a combination of OFDM and DSSS communications, or other schemes. Implementations of a wireless protocol using the 6 to 9 GHz bands may be used for wireless docking and wireless data transfer. Advantageously, aspects of certain devices implementing this particular wireless protocol may consume less power than devices implementing other wireless protocols, may be used to transmit wireless signals across short distances, and/or may be able to transmit signals less likely to be blocked by objects, such as humans.

In some implementations, a WLAN includes various devices which are the components that access the wireless network. For example, there may be two types of devices: access points ("APs") and clients (also referred to as stations, or "STAs"). In general, an AP serves as a hub or base station for the WLAN and an STA serves as a user of the WLAN. For example, a STA may be a laptop computer, a personal digital assistant (PDA), a mobile phone, etc. In an example, an STA connects to an AP via a WiFi (e.g., a IEEE 802.11 protocol) compliant wireless link to obtain general connectivity to the Internet or to other wide area networks. In some implementations an STA may also be used as an AP.

An access point ("AP") may also comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station "STA" may also comprise, be implemented as, or known as an access terminal ("AT"), a subscriber station, a subscriber unit, a mobile station, a remote station, a remote terminal, a user terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

As discussed above, certain of the devices described herein may implement a wireless protocol that uses the 6 to 9 GHz bands, for example. Such devices, whether used as an STA or AP or other device, may be used for wireless docking or for wireless data transfer (e.g., file transfer). Such devices may implement this wireless protocol in addition to another wireless protocol, such as another IEEE 802.11 protocol. For example, such devices may include two radios, one for transmitting and receiving signals using the 6 to 9 GHz bands and another for transmitting and receiving signals using another IEEE 802.11 protocol (e.g., such as IEEE 802.11ac, IEEE 802.11ah, etc.).

Certain of the devices described herein may further implement Multiple Input Multiple Output (MIMO) technology and be implemented as part of the wireless standard with transmissions in the 6 to 9 GHz bands. A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels or streams, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

FIG. 1 illustrates an example of a wireless communication system 100 in which aspects of the present disclosure may be employed. The wireless communication system 100 may operate pursuant to a wireless standard, for example a standard that uses the 6 to 9 GHz bands. The wireless communication system 100 may include an AP 104, which communicates with STAs 106.

A variety of processes and methods may be used for transmissions in the wireless communication system 100 between the AP 104 and the STAs 106. For example, signals may be sent and received between the AP 104 and the STAs 106 in accordance with OFDM/OFDMA techniques. If this is the case, the wireless communication system 100 may be referred to as an OFDM/OFDMA system. Alternatively, signals may be sent and received between the AP 104 and the STAs 106 in accordance with CDMA techniques. If this is the case, the wireless communication system 100 may be referred to as a CDMA system.

A communication link that facilitates transmission from the AP 104 to one or more of the STAs 106 may be referred to as a downlink (DL) 108, and a communication link that facilitates transmission from one or more of the STAs 106 to the AP 104 may be referred to as an uplink (UL) 110. Alternatively, a downlink 108 may be referred to as a forward link or a forward channel, and an uplink 110 may be referred to as a reverse link or a reverse channel.

The AP 104 may act as a base station and provide wireless communication coverage in a basic service area (BSA) 102.

The AP 104 along with the STAs 106 associated with the AP 104 and that use the AP 104 for communication may be referred to as a basic service set (BSS). It should be noted that the wireless communication system 100 may not have a central AP 104, but rather may function as a peer-to-peer network between the STAs 106. Accordingly, the functions of the AP 104 described herein may alternatively be performed by one or more of the STAs 106.

Figure 2:
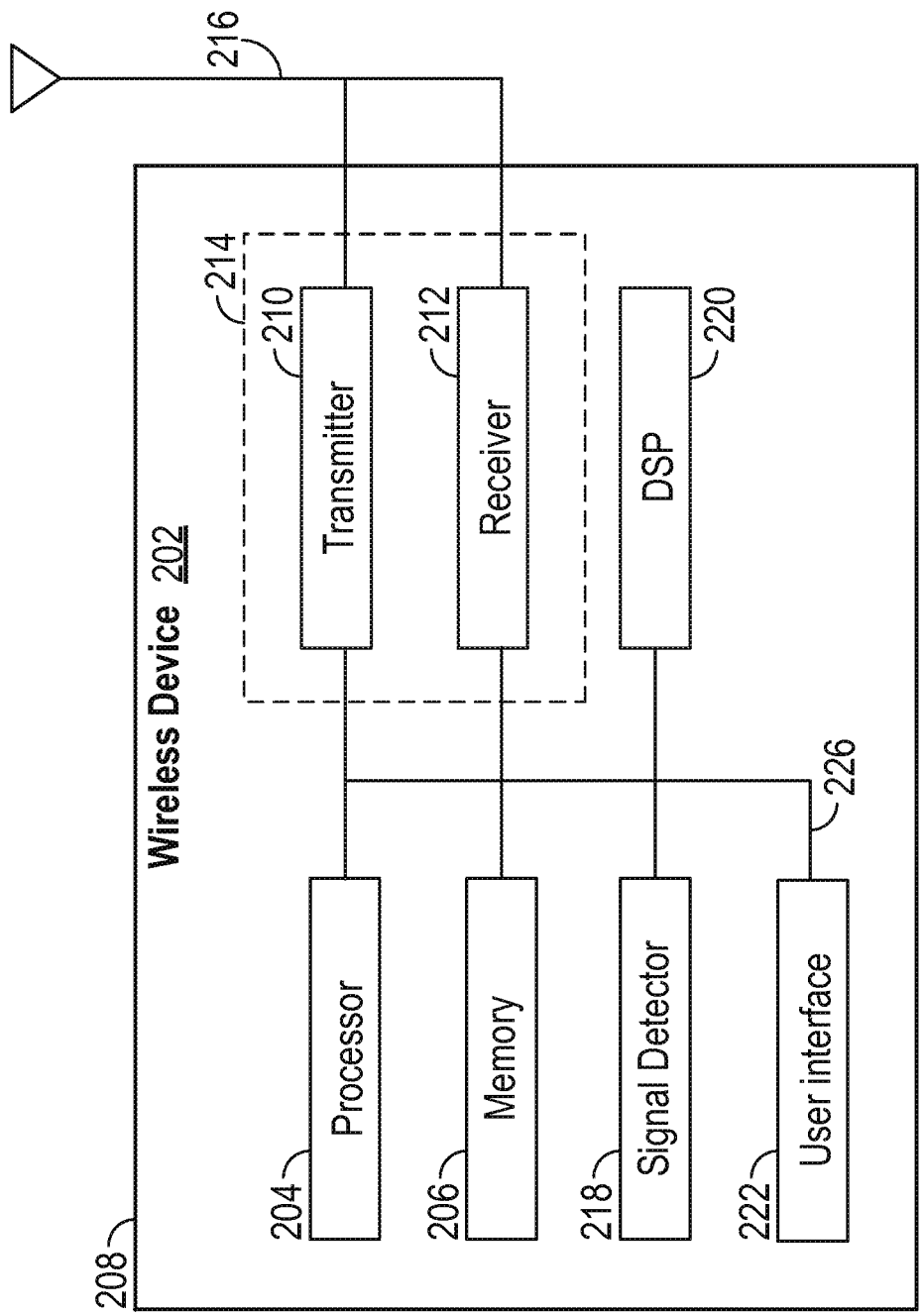
FIG. 2 shows a functional block diagram of an exemplary wireless device that may be employed within the wireless communication system of FIG. 1.

FIG. 2 illustrates various components that may be utilized in a wireless device 202 that may be employed within the wireless communication system 100. The wireless device 202 is an example of a device that may be configured to implement the various methods described herein. For example, the wireless device 202 may comprise the AP 104 or one of the STAs 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The processor 204 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals. The DSP 220 may be configured to generate a data unit for transmission. In some aspects, the data unit may comprise a physical layer data unit (PPDU). In some aspects, the PPDU is referred to as a packet.

The wireless device 202 may further comprise a user interface 222 in some aspects. The user interface 222 may comprise a keypad, a microphone, a speaker, and/or a display. The user interface 222 may include any element or component that conveys information to a user of the wireless device 202 and/or receives input from the user.

The various components of the wireless device 202 may be coupled together by a bus system 226. The bus system 226 may include a data bus, for example, as well as a power bus, a control signal bus, and a status signal bus in addition to the data bus. Those of skill in the art will appreciate the components of the wireless device 202 may be coupled together or accept or provide inputs to each other using some other mechanism.

Although a number of separate components are illustrated in FIG. 2, those of skill in the art will recognize that one or more of the components may be combined or commonly implemented. For example, the processor 204 may be used to implement not only the functionality described above with respect to the processor 204, but also to implement the functionality described above with respect to the signal detector 218 and/or the DSP 220. Further, each of the components illustrated in FIG. 2 may be implemented using a plurality of separate elements. Furthermore the processor 204 may be used to implement any of the components, modules, circuits, or the like described below, or each may be implemented using a plurality of separate elements.

Figure 3:
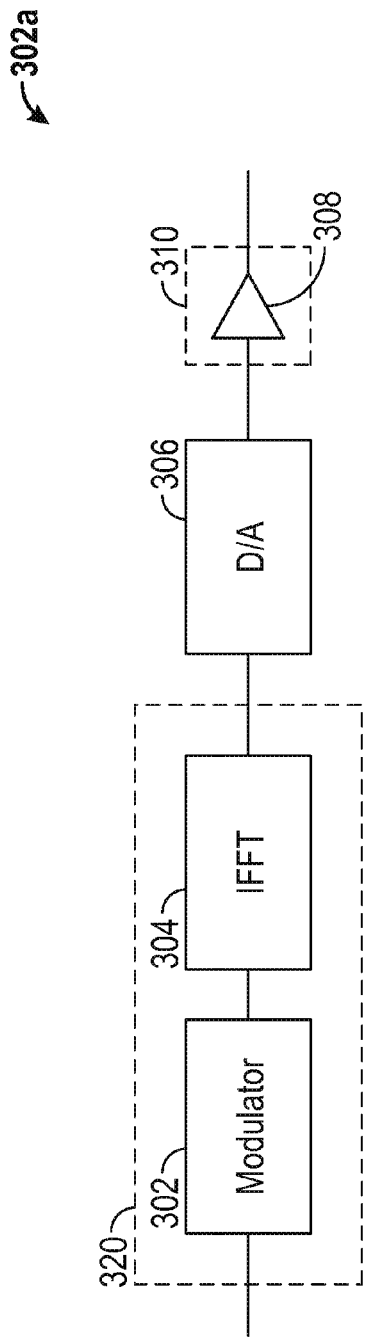
FIG. 3 shows a functional block diagram of exemplary components that may be utilized in the wireless device of FIG. 2 to transmit wireless communications.

As discussed above, the wireless device 202 may comprise an AP 104 or an STA 106, and may be used to transmit and/or receive communications. FIG. 3 illustrates various components that may be utilized in the wireless device 202 to transmit wireless communications. The components illustrated in FIG. 3 may be used, for example, to transmit OFDM communications. In some aspects, the components illustrated in FIG. 3 are used to generate and transmit packets to be sent over a channel bandwidth of approximately 500 MHz (e.g., between 450 MHz and 550 MHz), approximately 1000 MHz (e.g., between 900 MHz and 1100 MHz), or approximately 2000 MHz (e.g., between 1800 MHz and 2200 MHz), as will be discussed in additional detail below. For ease of reference, the wireless device 202 configured with the components illustrated in FIG. 3 is hereinafter referred to as a wireless device 302*a*.

The wireless device 302*a* may comprise a modulator 302 configured to modulate bits for transmission. For example, the modulator 302 may determine a plurality of symbols from bits received from the processor 204 (FIG. 2) or the user interface 222 (FIG. 2), for example by mapping bits to a plurality of symbols according to a constellation. The bits may correspond to user data or to control information. In some aspects, the bits are received in codewords. In one aspect, the modulator 302 comprises a QAM (quadrature amplitude modulation) modulator, for example a 16-QAM modulator or a 64-QAM modulator. In other aspects, the modulator 302 comprises a binary phase-shift keying (BPSK) modulator or a quadrature phase-shift keying (QPSK) modulator.

The wireless device 302*a* may further comprise a transform module 304 configured to convert symbols or otherwise modulated bits from the modulator 302 into a time domain. In FIG. 3, the transform module 304 is illustrated as being implemented by an inverse fast Fourier transform (IFFT) module. In some implementations, there may be multiple transform modules (not shown) that transform units of data of different sizes. In some implementations, the transform module 304 may be itself configured to transform units of data of different sizes. For example, the transform module 304 may be configured with a plurality of modes, and may use a different number of points to convert the symbols in each mode. For example, the IFFT may have a mode where 128 points are used to convert symbols being transmitted over 128 tones (i.e., subcarriers) into a time domain, a mode where 256 points are used to convert symbols being transmitted over 256 tones into a time domain, a mode where 512 points are used to convert symbols being transmitted over 512 tones into a time domain, a mode where 1024 points are used to convert symbols being transmitted over 1024 tones into a time domain, and a mode where 2048 points are used to convert symbols being transmitted over 2048 tones into a time domain. The number of points used by the transform module 304 may be referred to as the size of the transform module 304.

In FIG. 3, the modulator 302 and the transform module 304 are illustrated as being implemented in the DSP 320. In some aspects, however, one or both of the modulator 302 and the transform module 304 are implemented in the processor 204 or in another element of the wireless device 302a (e.g., see describe above with reference to FIG. 2).

As discussed above, the DSP 320 may be configured to generate a data unit for transmission. In some aspects, the modulator 302 and the transform module 304 may be configured to generate a data unit comprising a plurality of fields including control information and a plurality of data symbols. The fields including the control information may comprise one or more training fields, for example, and one or more signal (SIG) fields. Each of the training fields may include a known sequence of values or symbols. Each of the SIG fields may include information about the data unit, for example a description of a length or data rate of the data unit.

Returning to the description of FIG. 3, the wireless device 302a may further comprise a digital to analog converter 306 configured to convert the output of the transform module into an analog signal. For example, the time-domain output of the transform module 306 may be converted to a baseband OFDM signal by the digital to analog converter 306. The digital to analog converter 306 may be implemented in the processor 204 or in another element of the wireless device 202. In some aspects, the digital to analog converter 306 is implemented in the transceiver 214 (FIG. 2) or in a data transmit processor.

The analog signal may be wirelessly transmitted by the transmitter 310. The analog signal may be further processed before being transmitted by the transmitter 310, for example by being filtered or by being upconverted to an intermediate or carrier frequency. In the aspect illustrated in FIG. 3, the transmitter 310 includes a transmit amplifier 308. Prior to being transmitted, the analog signal may be amplified by the transmit amplifier 308. In some aspects, the amplifier 308 comprises a low noise amplifier (LNA).

The transmitter 310 is configured to transmit one or more packets or data units in a wireless signal based on the analog signal. The data units may be generated using the processor 204 (FIG. 2) and/or the DSP 320, for example using the modulator 302 and the transform module 304 as discussed above. Data units that may be generated and transmitted as discussed above are described in additional detail below with respect to FIGS. 5-18.

Figure 4:
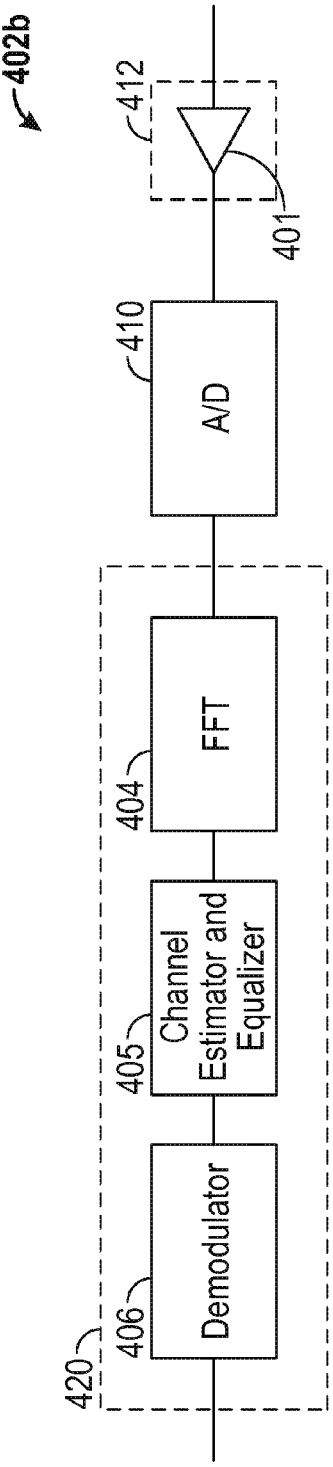
FIG. 4 shows a functional block diagram of exemplary components that may be utilized in the wireless device of FIG. 2 to receive wireless communications.

FIG. 4 illustrates various components that may be utilized in the wireless device 202 to receive wireless communications. The components illustrated in FIG. 4 may be used, for example, to receive OFDM communications. In some aspects, the components illustrated in FIG. 4 are used to receive data units over a channel bandwidth of approximately 500 MHz (e.g., between 450 MHz and 550 MHz), approximately 1000 MHz (e.g., between 900 MHz and 1100 MHz), or approximately 2000 MHz (e.g., between 1800 MHz and 2200 MHz). For example, the components illustrated in FIG. 4 may be used to receive data units transmitted by the components discussed above with respect to FIG. 3. For ease of reference, the wireless device 202 configured with the components illustrated in FIG. 4 is hereinafter referred to as a wireless device 402b.

The receiver 412 is configured to receive one or more packets or data units in a wireless signal.

In the aspect illustrated in FIG. 4, the receiver 412 includes a receive amplifier 401. The receive amplifier 401 may be configured to amplify the wireless signal received by the receiver 412. In some aspects, the receiver 412 is configured to adjust the gain of the receive amplifier 401 using an automatic gain control (AGC) procedure. In some aspects, the automatic gain control uses information in one or more received training fields, such as a received short training field (STF) for example, to adjust the gain. Those having ordinary skill in the art will understand methods for performing AGC. In some aspects, the amplifier 401 comprises an LNA.

The wireless device 402b may comprise an analog to digital converter 410 configured to convert the amplified wireless signal from the receiver 412 into a digital representation thereof. Further to being amplified, the wireless signal may be processed before being converted by the digital to analog converter 410, for example by being filtered or by being downconverted to an intermediate or baseband frequency. The analog to digital converter 410 may be implemented in the processor 204 (FIG. 2) or in another element of the wireless device 402b. In some aspects, the analog to digital converter 410 is implemented in the transceiver 214 (FIG. 2) or in a data receive processor.

The wireless device 402b may further comprise a transform module 404 configured to convert the representation of the wireless signal into a frequency spectrum. In FIG. 4, the transform module 404 is illustrated as being implemented by a fast Fourier transform (FFT) module. As described above with reference to FIG. 3, the transform module 404 may be configured with a plurality of modes, and may use a different number of points to convert the signal in each mode. For example, the transform module 404 may have a mode where 128 points are used to convert a signal received over 128 tones into a frequency spectrum, a mode where 256 points are used to convert a signal received over 256 tones into a frequency spectrum, a mode where 512 points are used to convert a signal received over 512 tones into a frequency spectrum, a mode where 1024 points are used to convert a signal received over 1024 tones into a frequency spectrum, and a mode where 2048 points are used to convert a signal received over 2048 tones into a frequency spectrum. The number of points used by the transform module 404 may be referred to as the size of the transform module 404. In some aspects, the transform module 404 may identify a symbol for each point that it uses.

The wireless device 402b may further comprise a channel estimator and equalizer 405 configured to form an estimate of the channel over which the data unit is received, and to remove certain effects of the channel based on the channel estimate. For example, the channel estimator 405 may be configured to approximate a function of the channel, and the channel equalizer may be configured to apply an inverse of that function to the data in the frequency spectrum.

In some aspects, the channel estimator and equalizer 405 uses information in one or more received training fields, such as a long training field (LTF) for example, to estimate the channel. The channel estimate may be formed based on one or more LTFs received at the beginning of the data unit. This channel estimate may thereafter be used to equalize data symbols that follow the one or more LTFs. After a certain period of time or after a certain number of data symbols, one or more additional LTFs may be received in the data unit. The channel estimate may be updated or a new estimate formed using the additional LTFs. This new or update channel estimate may be used to equalize data symbols that follow the additional LTFs. In some aspects, the new or updated channel estimate is used to re-equalize data symbols preceding the additional LTFs. Those having ordinary skill in the art will understand methods for forming a channel estimate.

The wireless device 402b may further comprise a demodulator 406 configured to demodulate the equalized data. For example, the demodulator 406 may determine a plurality of bits from symbols output by the transform module 404 and the channel estimator and equalizer 405, for example by reversing a mapping of bits to a symbol in a constellation. The bits may be processed or evaluated by the processor 204 (FIG. 2), or used to display or otherwise output information to the user interface 222 (FIG. 2). In this way, data and/or information may be decoded. In some aspects, the bits correspond to codewords. In one aspect, the demodulator 406 comprises a QAM (quadrature amplitude modulation) demodulator, for example a 16-QAM demodulator or a 64-QAM demodulator. In other aspects, the demodulator 406 comprises a binary phase-shift keying (BPSK) demodulator or a quadrature phase-shift keying (QPSK) demodulator.

In FIG. 4, the transform module 404, the channel estimator and equalizer 405, and the demodulator 406 are illustrated as being implemented in a DSP 420. In some aspects, however, one or more of the transform module 404, the channel estimator and equalizer 405, and the demodulator 406 are implemented in the processor 204 (FIG. 2) or in another element of the wireless device 202 (FIG. 2).

As discussed above, the wireless signal received at the receiver 212 comprises one or more data units. Using the functions or components described above, the data units or data symbols therein may be decoded evaluated or otherwise evaluated or processed. For example, the processor 204 (FIG. 2) and/or the DSP 420 may be used to decode data symbols in the data units using the transform module 404, the channel estimator and equalizer 405, and the demodulator 406.

Data units exchanged by the AP 104 and the STA 106 may include control information or data, as discussed above. At the physical (PHY) layer, these data units may be referred to as physical layer protocol data units (PPDUs). In some aspects, a PPDU may be referred to as a packet or physical layer packet. Each PPDU may comprise a preamble and a payload. The preamble may include training fields and a SIG field. The payload may comprise a Media Access Control (MAC) header or data for other layers, and/or user data, for example. The payload may be transmitted using one or more data symbols. The systems, methods, and devices herein may utilize data units with training fields whose peak-to-power ratio has been minimized.

The wireless device 302a shown in FIG. 3 shows an example of a single transmit chain to be transmitted over an antenna. In some implementations, the wireless device 302a may implement a portion of a MIMO system using multiple antennas to simultaneously transmit data.

Figure 5:
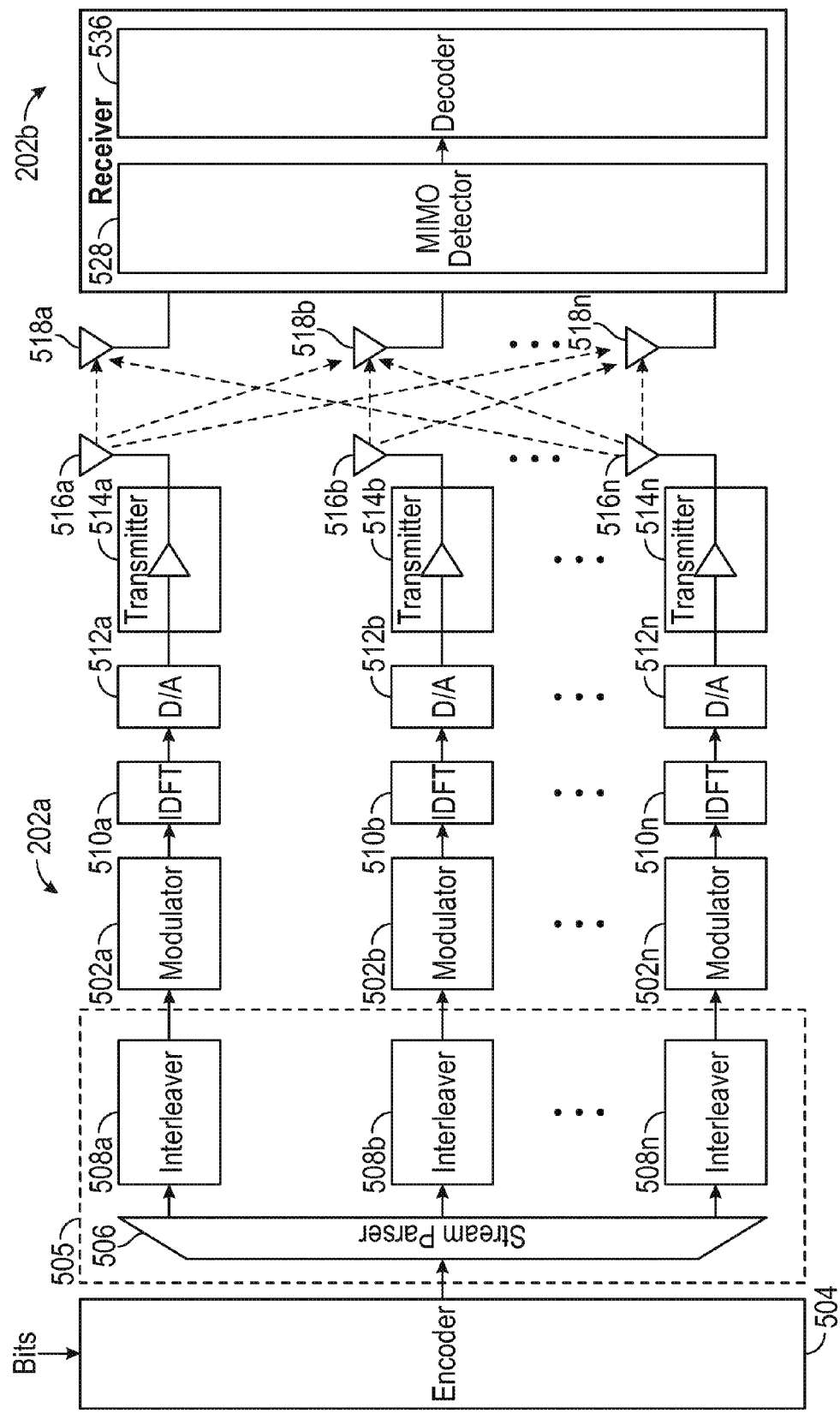
FIG. 5 is a functional block diagram of an exemplary MIMO system that may be implemented in wireless devices such as the wireless device of FIG. 2 to transmit wireless communications.

FIG. 5 is a functional block diagram of a MIMO system that may be implemented in wireless devices such as the wireless device 202 of FIG. 2 to transmit and receive wireless communications. The MIMO system may make use of some or all of the components described with reference to FIG. 3. Bits for transmission that are to be received at an output of the receiver are provided to an encoder 504. The encoder 504 may apply a forward error correcting (FEC) code on the bit stream. The FEC code may be a block code, a convolutional code, or the like. The encoded bits are provided to an interleaving system 505 that distributes the encoded bits into N transmit streams.

The interleaving system 505 includes a stream parser 506 that parses an input bit stream from the encoder 504 to N spatial stream interleavers 508a, 508b, and 508n. The stream parser 506 may be provided with the number of spatial streams and parse bits on a round-robin basis. Other parsing functions may also be used. One parsing function that may be used is $k_n = N_{TX}*k+n$ (i.e., round-robin with one bit per spatial stream, then on to the next spatial stream where is the input bit index and $N_{TX}$ is the number of transmitters/spatial streams). Another more general function f(k,n) might also be used, for example, sending two bits to a spatial stream, then moving on to the next spatial stream. Each interleaver 508a, 508b, and 508n may each thereafter distribute bits so that errors may be recovered due to fading or other channel conditions. Hereinafter the interleavers 508a, 508b, and 508n may be referred to an interleaver 508.

Each transmit stream may then be modulated by a modulator 502a, 502b, or 502n. As described above with reference to FIG. 3, the bits may be modulated using modulation techniques such as QPSK (Quaternary Phase Shift Keying) modulation, BPSK (mapping one bit at a time), 16-QAM (mapping group of six bits), 64-QAM, and the like. The modulated bits for each stream may be provided to transform modules 510a, 510b, and 510n. In some implementations, the transform modules 510a, 510b, and 510n may perform an inverse discrete time fourier transform (IDFT) to convert the modulated bits from a frequency domain into a time domain. The transform modules 510a, 510b, and 510n may operate according to different modes as described above with reference to FIG. 3. For example, the transform modules 510a, 510b, and 510n may be configured to operate according to a 128 point mode, a 256 point mode, a 512 point mode, a 1024 point mode, or a 2048 point mode. In some implementations, the modulated bits may be encoded using space time block coding (STBC) and spatial mapping may be performed before being provided to transform modules 510a, 510b, and 510n. After the modulated bits have been converted into time domain signals for each spatial stream, the time domain signal may be converted into an analog signal via converters 512a, 512b, and 512n as described above with reference to FIG. 3. The signals may then be transmitted using transmitters 514a, 514b, and 514c and using antennas 516a, 516b, or 516n, into a wireless radio space over a desired frequency bandwidth (e.g., approximately 500 MHz, approximately 1000 MHz, approximately 2000 MHz, or higher).

In some embodiments, antennas 516a, 516b, and 516n are distinct and spatially separated antennas. In other embodiments, distinct signals might be combined into different polarizations off of fewer than N antennas. An example of this is where spatial rotation or spatial spreading is done, where multiple spatial streams are mapped on a single antenna. In any case, it should be understood that distinct spatial streams can be organized in different manners. For example, a transmit antenna might carry data from more than one spatial stream or several transmit antennas might carry data from a spatial stream. For example, consider the case of a transmitter with four transmit antennas and two spatial streams. Each spatial stream can be mapped onto two transmit antennas in that case, so two antennas are carrying data from just one spatial stream.

Figure 6:
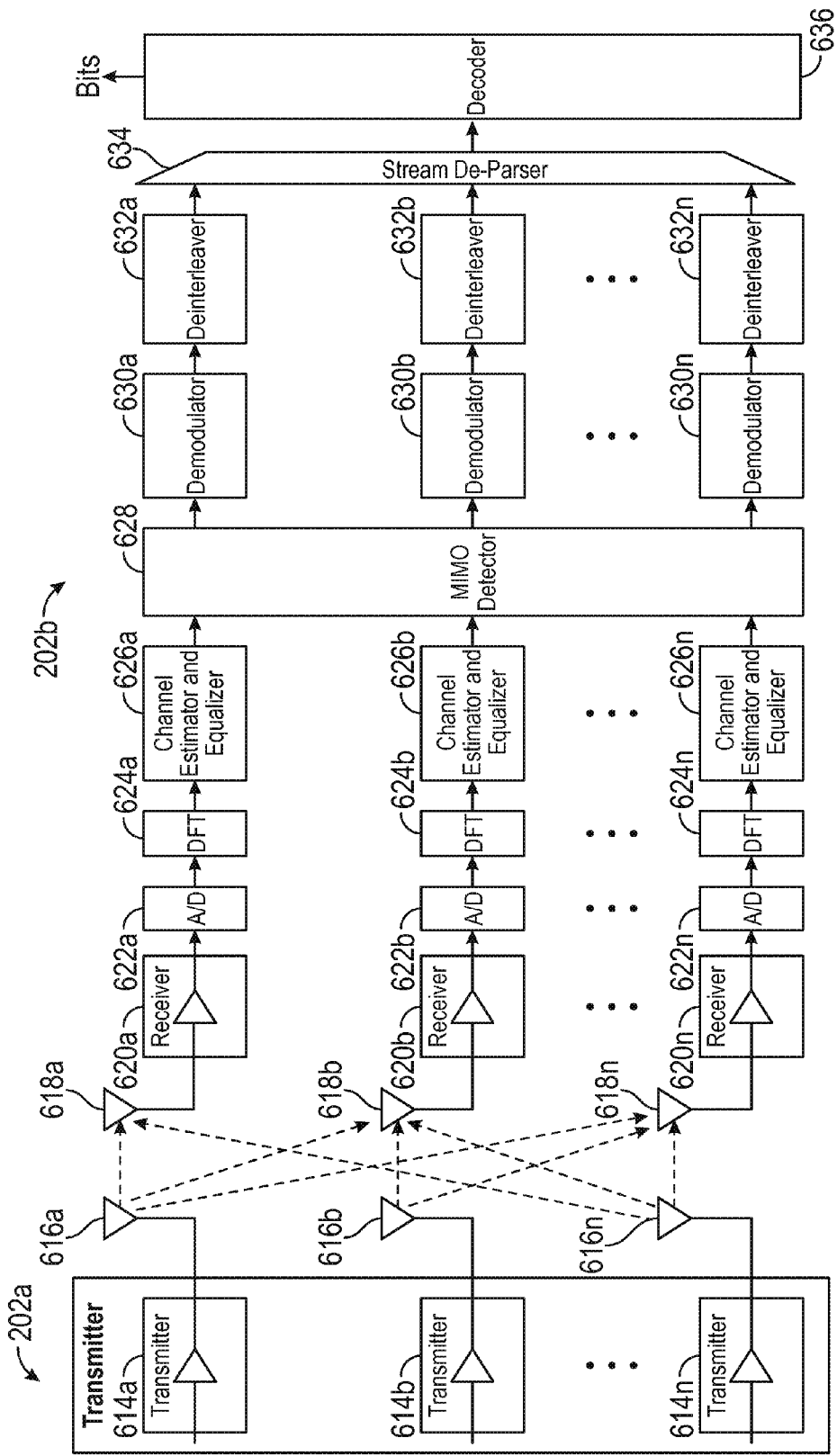
FIG. 6 is a functional block diagram of an exemplary MIMO system that may be implemented in wireless devices such as the wireless device of FIG. 2 to receive wireless communications.

FIG. 6 is a functional block diagram of an exemplary MIMO system that may be implemented in wireless devices such as the wireless device 202 of FIG. 2 to receive wireless communications. The wireless device 202b may be configured to simultaneously receive transmissions from the antennas 516a, 516b, and 516n of FIG. 5. A wireless device 202b receives signals from the channel at N antennas 518a, 518b, and 518n (counting separate polarizations, as appropriate) coupled to N receive circuits. The signals are then provided to receivers 620a, 620b, and 620n that each may include an amplifier configured to amplify the received signals. The signals may then be converted into a digital form via converters 622a, 622b, and 622n.

Converted signals may then be converted into a frequency spectrum via transform modules 624a, 624b, and 624n. As described above, the transform modules 624a, 624b, and 624n may operating according to various modes according to the size and bandwidth used (e.g., 128 point, 256 point, 512 point, 1024 point, 2048 point, etc.). The transformed signals may be provided to respective channel estimator and equalizer blocks 626a, 626b, and 626n that may function similarly as described above with reference to FIG. 4. After channel estimation, the outputs may be provided to a MIMO detector 628 which may thereafter provide its output to demodulators 630a, 630b, and 630n which may demodulate the bits according to one of the modulation techniques as described above. Demodulated bits may then be provided to deinterleavers 632a, 632b, and 632n which may pass bits into a stream de-parser 634 which may provide the bits into a single bit stream into a decoder 636 that may decode the bits into an appropriate data stream.

As described above, data units exchanged by the AP 104 and the STA 106 may include control information or data, as discussed above in the form of physical (PHY) layer packets or physical layer protocol data units (PPDUs).

Figure 7:
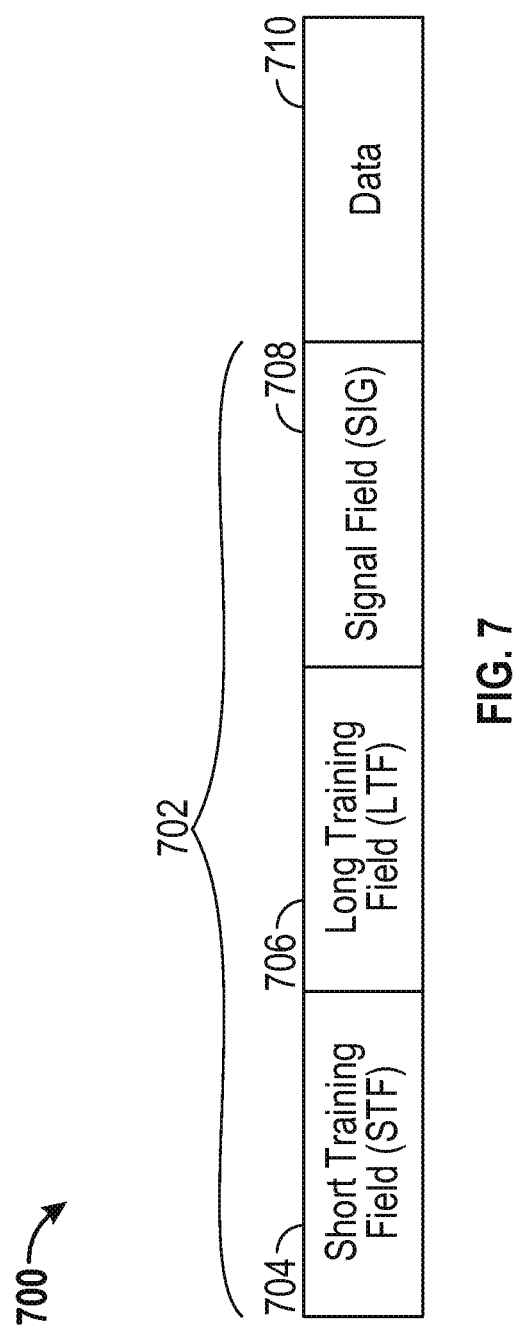
FIG. 7 is a block diagram showing an exemplary structure of a preamble and payload of a physical layer packet.

FIG. 7 is a block diagram showing an exemplary structure of a preamble 702 and payload 710 of a physical layer packet 700. The preamble 702 may include a short training field (STF) 704 that includes an STF sequence of known values. In some aspects, the STF may be used for packet detection (e.g., to detect the start of a packet) and for coarse time/frequency estimation. The STF sequence may be optimized to have a low PAPR and include a subset of non-zero tones with a particular periodicity. The STF 704 may span one or multiple OFDM symbols. The preamble 702 may further include a long training field (LTF) 706 that may span one or multiple OFDM symbols and may include one or more LTF sequences of known non-zero values. The LTF may be used for channel estimation, fine time/frequency estimation, and mode detection. The preamble 702 may further include a signal field (SIG) 708 as described above that may include a number of bits or values used in one aspect for mode detection purposes and determination of transmission parameters.

As described above, devices in a wireless network may transmit/receive information between each other. Generally, the devices transmit/receive information within a set frequency channel. One such frequency channel could be the ultra wideband channel (e.g., 6-9 GHz). Often, devices are capable of transmitting within one or more channel bandwidths within the frequency channel. In order to avoid interference or other such issues during transmissions in the frequency channel, the wireless network may mandate a minimum duration of cyclic prefix (CP) (e.g., a minimum overhead). The CP may refer to the prefixing of a symbol, such as an OFDM symbol, with a repetition of the end of the symbol. The CP may serve to eliminate intersymbol interference and allow for simple frequency-domain processing. Often, in wireless communications, a receiver may receive multiple copies of the same signal. For example, a receiver can receive a first copy of a packet directly from the transmitter (e.g., via direct line-of-sight). The receiver can also receive one or more other copies of the signal indirectly from the transmitter (e.g., these other copies may bounce or reflect off nearby objects). The amount of time between arrival of the first copy of the signal and the last copy of the signal may be referred to as the delay spread of the channel. The delay spread of the channel can vary based on the environment in which the transmitter and/or receiver reside and can be characterized by the number of taps in the impulse response of the channel. Generally, however, devices select from one or more CP durations that are set a priori in the communication standard. Setting the CP duration to be greater than the delay spread of the channel can thus serve to eliminate intersymbol interference.

In addition, delays can be introduced by the front-end processing performed by transmitters and receivers. Front-end processing may entail filtering a signal before transmission of the signal (e.g., by a transmitter) or filtering a signal after reception of the signal (e.g., by a receiver). For example, transmitter 210 of wireless device 202 may include a digital filter, the output of which is coupled to an RF filter, where both filters serve to limit the band of the signal before transmission of the signal. Likewise, receiver 212 of wireless device 202 may include an RF filter, the output of which is coupled to a digital filter, where both filters serve to limit the band of the signal after reception of the signal. The filters can introduce a finite amount of delay (e.g., which can be measured based on the number of taps in the respective filter's impulse response). Thus, setting the CP duration to be greater than the combination of the delay spread of the channel and the delay introduced by front-end processing can serve to eliminate intersymbol interference. As an example, the duration of a CP may be 12.5% or 25% of the duration of a symbol.

In conventional systems, the CP duration is fixed for transmissions in a given frequency channel, regardless of the channel bandwidth. By having a fixed CP duration, all devices that transmit within the frequency channel can be configured to communicate using the same fixed CP duration, regardless of the channel bandwidth that the devices use to communicate. In other words, devices can be efficiently designed and can be compatible with other devices that transmit in different channel bandwidths.

However, the fixed CP duration fails to take advantage of some benefits. For example, as described above, the CP duration is set such that it is greater than the delay spread of the channel and the delay introduced by front-end processing. But as the channel bandwidth increases, the delay introduced by the receive processing decreases such that that the overall delay introduced by the front-end processing is less. Thus, less overhead is required as the channel bandwidth increases. Furthermore, devices configured to communicate in the frequency channel can be designed with more efficient receivers and/or filters as time passes. The more efficient receivers and/or filters could require less overhead, especially as the channel bandwidth increases.

Accordingly, certain implementations described herein include devices that operate in the ultra wideband channel, where the CP duration varies depending on the channel bandwidth. In addition, based on the use of more efficient receivers and/or filters, the minimum CP duration is reduced when compared to conventional systems because of the lower delay spread requirements. As described above, certain implementations described herein may be directed to wireless communication systems that may be used for wireless docking or wireless data transfer. Also, certain implementations may achieve reduced phase noise, since symbol durations are smaller than in similar protocols like IEEE 802.11ac, and may achieve similar LO accuracy as traditional WiFi.

As described above, certain implementations are directed to transmitting and receiving wireless signals in the six to nine gigahertz bands. In one aspect, this may result in transmissions using a channel bandwidth of approximately 500 MHz (e.g., between 450 MHz and 550 MHz, between 480 MHz and 520 MHz, between 490 MHz and 510 MHz, etc.), approximately 1000 MHz (e.g., between 900 MHz and 1100 MHz, between 960 MHz and 1040 MHz, between 980 MHz and 1020 MHz, etc.), or approximately 2000 MHz (e.g., between 1800 MHz and 2200 MHz, between 1920 MHz and 2080 MHz, between 1960 MHz and 2040 MHz, etc.).

For example, in one implementation, a symbol may be configured to be transmitted or received using a channel bandwidth of approximately 500 MHz. A wireless device 202 may be configured to operate in one of several modes. In one mode, symbols such as OFDM symbols may be transmitted or received using a bandwidth of approximately 500 MHz. In another mode, symbols may be transmitted or received using a channel bandwidth of approximately 1000 MHz. Additional modes may also be provided for transmitting or receiving symbols using a bandwidth of approximately 2000 MHz, and the like. The bandwidth may also be referred to as the channel width or the channel bandwidth.

FIG. 8A illustrates the numerology for three embodiments of transmissions in the 6 to 9 GHz bands. Specifically, FIG. 8A illustrates the numerology when the CP duration is fixed. In an embodiment, block 802 displays the numerology for a first embodiment, block 804 displays the numerology for a second embodiment, and block 806 displays the numerology for a third embodiment. FIG. 8A illustrates the numerology for all three modes in each embodiment.

Each mode may use a different number of tones/subcarriers for transmitting the information. For example, in one implementation, as illustrated in FIG. 8A at blocks 802, 804, and 806, a 500 MHz mode (corresponding to transmitting or receiving symbols using a bandwidth of approximately 500 MHz) may use 128 tones, 256 tones, or 512 tones. In another implementation, as illustrated in FIG. 8A at blocks 802, 804, and 806, a 1000 MHz mode (corresponding to transmitting or receiving symbols using a bandwidth of approximately 1000 MHz) may use 256 tones, 512 tones, or 1024 tones. In another implementation, as illustrated in FIG. 8A at blocks 802, 804, and 806, a 2000 MHz mode (corresponding to transmitting or receiving symbols using a bandwidth of approximately 2000 MHz) may use 512 tones, 1024 tones, or 2048 tones.

The variations in tones for each of the three modes may depend on the IFFT 304 and/or the FFT 404 size. The IFFT 304 and/or the FFT 404 size may be dependent on four factors: (1) the delay spread of the channel; (2) LO accuracy requirements; (3) phase noise specifications; and (4) coherence time. In an embodiment, it may be beneficial if the delay spread of the channel is less than a cyclic prefix (CP) duration. A CP may refer to the prefixing of a symbol, such as an OFDM symbol, with a repetition of the end of the symbol. The CP may serve to eliminate intersymbol interference and allow for simple frequency-domain processing. For example, the duration of a CP may be 12.5% or 25% of the duration of a symbol.

In a further embodiment, it may be beneficial if the CP accounts for filter time. The CP for transmissions in the 6 to 9 GHz bands may be calculated by looking at the requirements in other wireless protocols. For example, in IEEE 802.11ac, the RMS delay spread for D-NLOS channels are about 50 ns and the CP duration is about 800 ns. In an embodiment, filtering accounts for about 400 ns of the CP duration. Based on this data, about 32 ns may be required for filtering in the 6 to 9 GHz bands. Accordingly, as illustrated in block 806, a CP duration of 64 ns may be sufficient in some LOS channel models. In some aspects, as illustrated in blocks 802 and 804, a CP duration of 128 ns is sufficient for most channel models.

In addition, in may be beneficial if a subcarrier width (e.g., the subcarrier spacing) is selected such that it is smaller than a coherence bandwidth (e.g., the approximate maximum frequency interval over which two frequencies of a signal may experience comparable amplitude fading) of the channel. For example, to ensure that the subcarrier width is less than the coherence bandwidth, at least 128 subcarriers may be needed for a channel bandwidth of 500 MHz, as illustrated in block 806. In some aspects, at least 256 subcarriers may be needed for a channel bandwidth of 500 MHz, as illustrated in blocks 802 and 804.

In an embodiment, the LO accuracy requirements may depend on the subcarrier spacing. For example, it may be beneficial if the maximum frequency offset generated by an oscillator whose accuracy is ±20 ppm is less than the subcarrier spacing.

In an embodiment, the power consumed in a receiver will increase as the FFT 404 size increases. Furthermore, the complexity of the receiver may increase as the FFT 404 size increases. For example, the number of cycles in the FFT 404 engine may grow as N log N, where N is the FFT size. Once the FFT 404 size and CP duration is selected for the 500 MHz mode, the FFT 404 size and CP duration may be extended to the 1000 MHz mode and the 2000 MHz mode. For example, the FFT 404 size and/or the CP duration may be scaled proportionally.

For example, in block 802, for a channel bandwidth of 500 MHz, the FFT 404 size is 256 and the CP duration is 128 ns. For a channel bandwidth of 1000 MHz, the FFT 404 size is scaled to 512 and the CP duration remains 128 ns. For a channel bandwidth of 2000 MHz, the FFT 404 size is scaled to 1024 and the CP duration remains 128 ns. Note that for all three modes, the CP duration is 25% of overhead.

As another example, in block 804, for a channel bandwidth of 500 MHz, the FFT 404 size is 512 and the CP duration is 128 ns. For a channel bandwidth of 1000 MHz, the FFT 404 size is scaled to 1024 and the CP duration remains 128 ns. For a channel bandwidth of 2000 MHz, the FFT 404 size is scaled to 2048 and the CP duration remains 128 ns. Note that for all three modes, the CP duration is 12.5% of overhead. A CP duration of 12.5% may increase FFT size, which in turn may increase power consumed and receiver complexity.

As another example, in block 806, for a channel bandwidth of 500 MHz, the FFT 404 size is 128 and the CP duration is 64 ns. For a channel bandwidth of 1000 MHz, the FFT 404 size is scaled to 256 and the CP duration remains 64 ns. For a channel bandwidth of 2000 MHz, the FFT 404 size is scaled to 512 and the CP duration remains 64 ns. Note that for all three modes, the CP duration is 25% of overhead.

In some embodiments, the CP duration may be changed as a function of channel bandwidth. In particular, at higher bandwidths, filtering may consume less time. Since the CP duration accounts for filtering, the CP duration may be reduced as the channel bandwidth increases. The OFDM symbol time may be a function of the CP duration. For example, the OFDM symbol time may be calculated by adding the duration of the CP with a sampling time of the FFT. Thus, the reduction in the CP duration may result in a reduction of the OFDM symbol time.

FIG. 8B illustrates the numerology for three embodiments of transmissions in the 6 to 9 GHz bands. Specifically, FIG. 8B illustrates the numerology when the CP duration is not fixed, but instead varies as a function of channel bandwidth. In an embodiment, block 852 displays the numerology for a first embodiment, block 854 displays the numerology for a second embodiment, and block 856 displays the numerology for a third embodiment. FIG. 8B illustrates the numerology for all three modes in each embodiment.

As illustrated in FIG. 8B, block 852 is similar to block 802 of FIG. 8A, block 854 is similar to block 804 of FIG. 8A, and block 856 is similar to block 806 of FIG. 8A. However, the CP duration for a channel bandwidth of 1000 MHz or 2000 MHz in blocks 852, 854, and 856 may not be static. Instead, the CP duration for channel bandwidths of 1000 MHz or 2000 MHz may vary. In an embodiment, the CP duration for channel bandwidths of 1000 MHz and 2000 MHz may be a function of the variable x. The variable x may range from 8 ns to 16 ns.

In an embodiment, the CP duration at block 852 for a channel bandwidth of 1000 MHz may range between 112 ns and 120 ns. Thus, the OFDM symbol time may range between 624 ns and 632 ns. In a further embodiment, the CP duration at block 852 for a channel bandwidth of 1000 MHz may range between 112 ns and 128 ns. Thus, the OFDM symbol time may range between 624 ns and 640 ns.

In an embodiment, the CP duration at block 854 for a channel bandwidth of 1000 MHz may range between 112 ns and 120 ns. Thus, the OFDM symbol time may range between 1136 ns and 1144 ns. In a further embodiment, the CP duration at block 854 for a channel bandwidth of 1000 MHz may range between 112 ns and 128 ns. Thus, the OFDM symbol time may range between 1136 ns and 1152 ns.

In an embodiment, the CP duration at block 856 for a channel bandwidth of 1000 MHz may range between 48 ns and 56 ns. Thus, the OFDM symbol time may range between 304 ns and 312 ns. In a further embodiment, the CP duration at block 856 for a channel bandwidth of 1000 MHz may range between 48 ns and 64 ns. Thus, the OFDM symbol time may range between 304 ns and 320 ns.

In an embodiment, the CP duration at block 852 for a channel bandwidth of 2000 MHz may range between 104 ns and 116 ns. Thus, the OFDM symbol time may range between 616 ns and 628 ns. In a further embodiment, the CP duration at block 852 for a channel bandwidth of 2000 MHz may range between 104 ns and 128 ns. Thus, the OFDM symbol time may range between 616 ns and 640 ns.

In an embodiment, the CP duration at block 854 for a channel bandwidth of 2000 MHz may range between 104 ns and 116 ns. Thus, the OFDM symbol time may range between 1128 ns and 1140 ns. In a further embodiment, the CP duration at block 854 for a channel bandwidth of 2000 MHz may range between 104 ns and 128 ns. Thus, the OFDM symbol time may range between 1128 ns and 1152 ns.

In an embodiment, the CP duration at block 856 for a channel bandwidth of 2000 MHz may range between 40 ns and 52 ns. Thus, the OFDM symbol time may range between 296 ns and 308 ns. In a further embodiment, the CP duration at block 856 for a channel bandwidth of 2000 MHz may range between 40 ns and 64 ns. Thus, the OFDM symbol time may range between 296 ns and 320 ns.

In some aspects, to generate/evaluate symbols sent or received using 128 tones, a transform module 304 or 404 as described above may be configured to use a 128 point mode (e.g., a 128 point IFFT or FFT). To generate/evaluate symbols sent or received using 256 tones, a transform module 304 or 404 as described above may be configured to use a 256 point mode (e.g., a 256 point IFFT or FFT). To generate/evaluate symbols sent or received using 512 tones, a transform module 304 or 404 as described above may be configured to use a 512 point mode (e.g., a 512 point IFFT or FFT). To generate/ evaluate symbols sent or received using 1024 tones, a transform module 304 or 404 as described above may be configured to use a 1024 point mode (e.g., a 1024 point IFFT or FFT). To generate/evaluate symbols sent or received using 2048 tones, a transform module 304 or 404 as described above may be configured to use a 2048 point mode (e.g., a 2048 point IFFT or FFT).

For example, a wireless device 302a (FIG. 3) may be configured to generate a packet for transmission via a wireless signal using a bandwidth of 500 MHz. In one aspect, the bandwidth may be approximately 500 MHz, where approximately 500 MHz may be within a range of 450 MHz to 550 MHz, within a range of 480 MHz to 520 MHz, or within a range of 490 MHz to 510 MHz. The packet may be formed of one or more OFDM symbols having 128 tones, 256 tones, or 512 tones using a processor 320. A transform module 304 in a transmit chain may be configured as an IFFT module operating according to a 128 point mode, 256 point mode, or 512 point mode to convert the packet into a time domain signal. A transmitter 310 may then be configured to transmit the packet.

Likewise, a wireless device 402b (FIG. 4) may be configured to receive the packet over a bandwidth of 500 MHz. In one aspect, the bandwidth may be approximately 500 MHz, where approximately 500 MHz may be within a range of 450 MHz to 550 MHz, within a range of 480 MHz to 520 MHz, or within a range of 490 MHz to 510 MHz. The wireless device 402b may include a processor 420 including a transform module 404 in a receive chain that may be configured as an FFT module operating according to a 128 point mode, 256 point mode, or 512 point mode to transform the time domain signal into a frequency spectrum. A processor 420 may be configured to evaluate the packet.

As another example, a wireless device 302a (FIG. 3) may be configured to generate a packet for transmission via a wireless signal using a bandwidth of 1000 MHz. In one aspect, the bandwidth may be approximately 1000 MHz, where approximately 1000 MHz may be within a range of 900 MHz to 1100 MHz, within a range of 960 MHz to 1040 MHz, or within a range of 980 MHz to 1020 MHz. The packet may be formed of one or more OFDM symbols having 256 tones, 512 tones, or 1024 tones using a processor 320. A transform module 304 in a transmit chain may be configured as an IFFT module operating according to a 256 point mode, 512 point mode, or 1024 point mode to convert the packet into a time domain signal. A transmitter 310 may then be configured to transmit the packet.

Likewise, a wireless device 402b (FIG. 4) may be configured to receive the packet over a bandwidth of 1000 MHz. In one aspect, the bandwidth may be approximately 1000 MHz, where approximately 1000 MHz may be within a range of 900 MHz to 1100 MHz, within a range of 960 MHz to 1040 MHz, or within a range of 980 MHz to 1020 MHz. The wireless device 402b may include a processor 420 including a transform module 404 in a receive chain that may be configured as an FFT module operating according to a 256 point mode, 512 point mode, or 1024 point mode to transform the time domain signal into a frequency spectrum. A processor 420 may be configured to evaluate the packet.

As another example, a wireless device 302a (FIG. 3) may be configured to generate a packet for transmission via a wireless signal using a bandwidth of 2000 MHz. In one aspect, the bandwidth may be approximately 2000 MHz, where approximately 2000 MHz may be within a range of 1800 MHz to 2200 MHz, within a range of 1920 MHz to 2080 MHz, or within a range of 1960 MHz to 2040 MHz. The packet may be formed of one or more OFDM symbols having 512 tones, 1024 tones, or 2048 tones using a processor 320. A transform module 304 in a transmit chain may be configured as an IFFT module operating according to a 512 point mode, 1024 point mode, or 2048 point mode to convert the packet into a time domain signal. A transmitter 310 may then be configured to transmit the packet.

Likewise, a wireless device 402b (FIG. 4) may be configured to receive the packet over a bandwidth of 2000 MHz. In one aspect, the bandwidth may be approximately 2000 MHz, where approximately 2000 MHz may be within a range of 1800 MHz to 2200 MHz, within a range of 1920 MHz to 2080 MHz, or within a range of 1960 MHz to 2040 MHz. The wireless device 402b may include a processor 420 including a transform module 404 in a receive chain that may be configured as an FFT module operating according to a 512 point mode, 1024 point mode, or 2048 point mode to transform the time domain signal into a frequency spectrum. A processor 420 may be configured to evaluate the packet.

Figure 9:
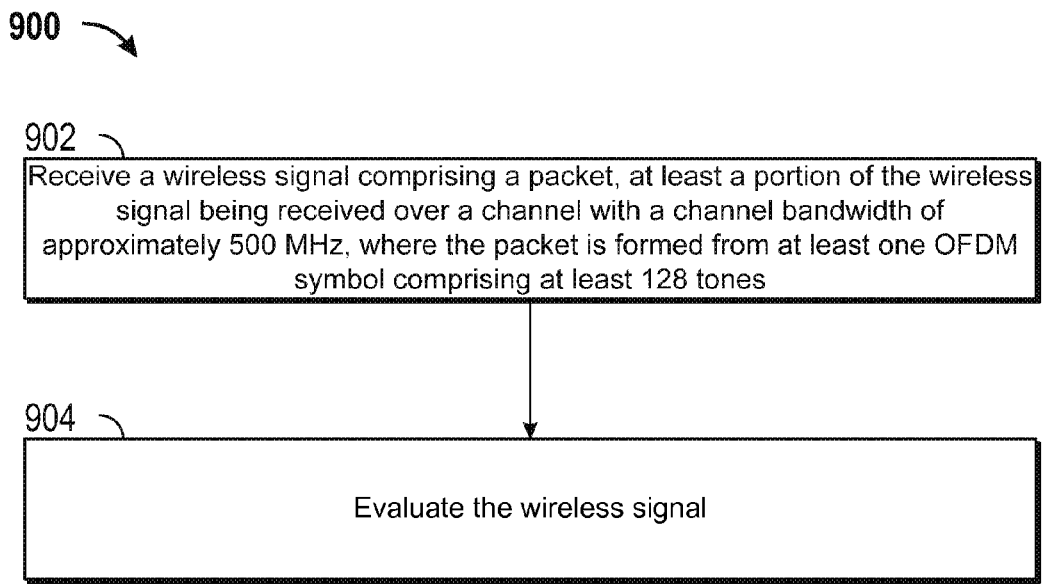
FIG. 9 is a flow chart of an exemplary method for receiving a packet sent via a wireless signal.

FIG. 9 illustrates an aspect of a method 900 for receiving a packet. The method 900 may be used to receive any of the packets described above. The packets may be received by either the AP 104 or the STA 106 and transmitted from another node in the wireless network 100. Although the method 900 is described below with respect to elements of the wireless device 202, those having ordinary skill in the art will appreciate that other components may be used to implement one or more of the steps described herein.

At block 902, a wireless signal comprising a packet is received. In the aspect illustrated in FIG. 9, at least a portion of the wireless signal is received over a channel with a channel bandwidth of approximately 500 MHz. The packet may be formed from at least one OFDM symbol comprising at least 128 tones. In an embodiment, the packet further includes a cyclic prefix. In a further embodiment, a duration of the cyclic prefix is a function of the channel bandwidth and is set such that the duration of the cyclic prefix is greater than a delay spread of the channel and delay introduced by front-end processing.

At block 904, the wireless signal is evaluated. In an embodiment, the at least one OFDM symbol is converted into a frequency domain signal.

Figure 10:
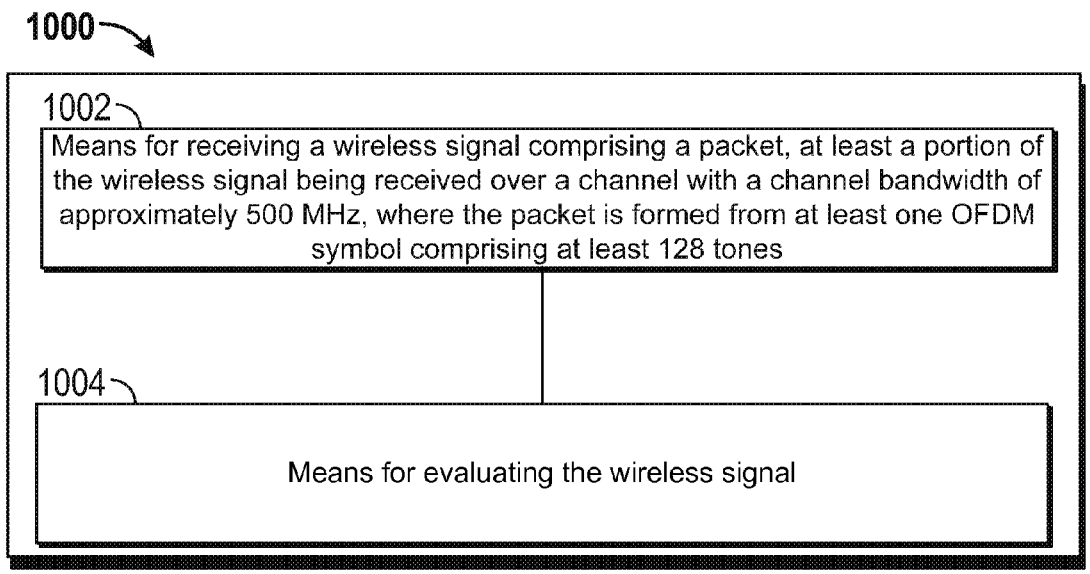
FIG. 10 is a functional block diagram of an exemplary wireless device that may be employed within the wireless communication system of FIG. 1.

FIG. 10 is a functional block diagram of an exemplary device 1000 that may be employed within the wireless communication system 100. The device 1000 includes means 1002 for receiving a wireless signal comprising a packet, at least a portion of the wireless signal being received over a channel with a channel bandwidth of approximately 500 MHz, where the packet is formed from at least one OFDM symbol comprising at least 128 tones. In an embodiment, means 1002 for receiving a wireless signal comprising a packet, at least a portion of the wireless signal being received over a channel bandwidth of approximately 500 MHz, where the packet is formed from at least one OFDM symbol comprising at least 128 tones, may be configured to perform one or more of the functions discussed above with respect to block 902. The means 1002 for receiving may correspond to the receiver 212, and may include the amplifier 401. The device 1000 further includes means 1004 for evaluating the wireless signal. In an embodiment, means 1004 for evaluating the wireless signal may be configured to perform one or more of the functions discussed above with respect to block 904. The means 1004 for evaluating may correspond to the processor 204.

Figure 11:
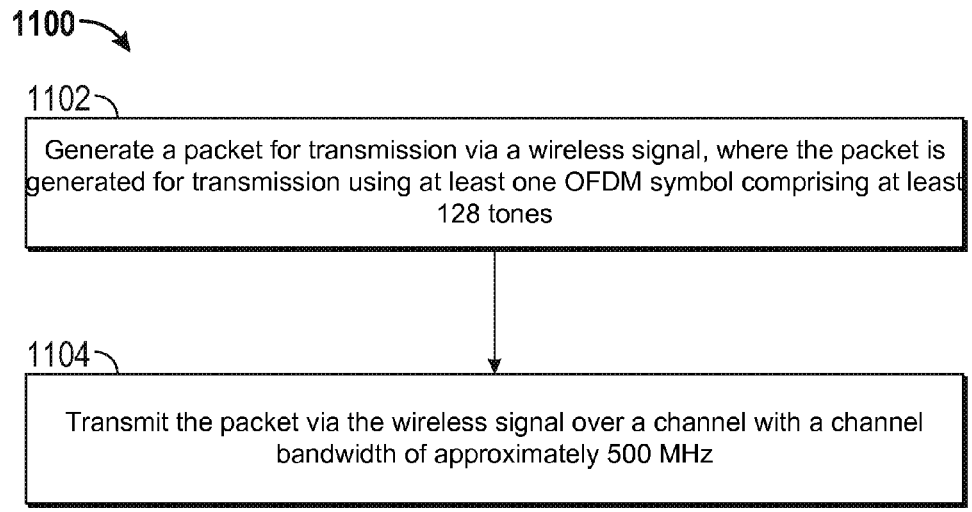
FIG. 11 is a flow chart of an exemplary method for generating and transmitting a packet via a wireless signal.

FIG. 11 illustrates an aspect of a method 1100 for generating and transmitting a packet. The method 1100 may be used to generate and transmit any of the packets described above. The packets may be transmitted from either the AP 104 or the STA 106 and received by another node in the wireless network 100. Although the method 1100 is described below with respect to elements of the wireless device 202, those having ordinary skill in the art will appreciate that other components may be used to implement one or more of the steps described herein.

At block 1102, a packet is generated for transmission via a wireless signal. In the aspect illustrated in FIG. 11, the packet is generated for transmission using at least one OFDM symbol comprising at least 128 tones.

At block 1104, the packet is transmitted via the wireless signal over a channel with a channel bandwidth of approximately 500 MHz. In an embodiment, the packet further includes a cyclic prefix. In a further embodiment, a duration of the cyclic prefix is a function of the channel bandwidth and is set such that the duration of the cyclic prefix is greater than a delay spread of the channel and delay introduced by front-end processing.

Figure 12:
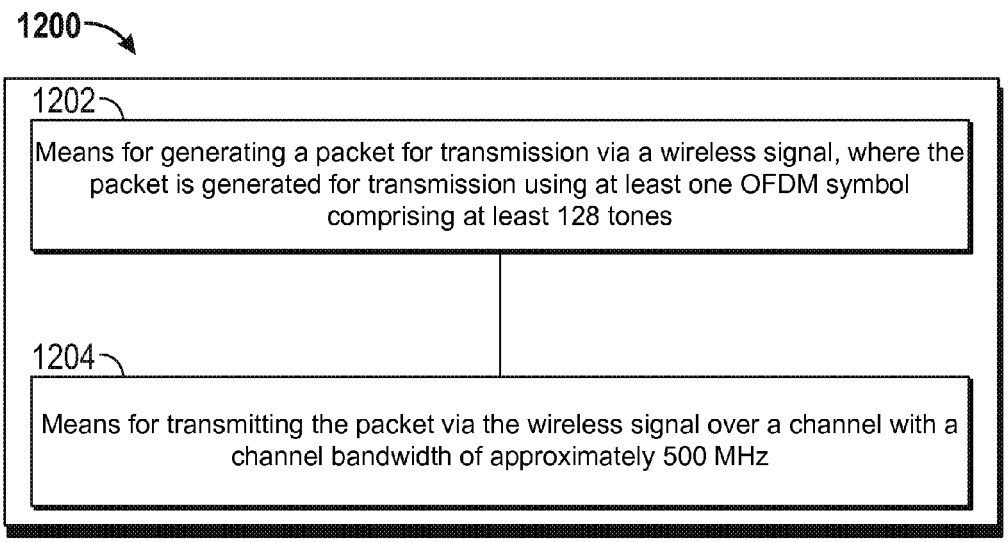
FIG. 12 is a functional block diagram of an exemplary wireless device that may be employed within the wireless communication system of FIG. 1.

FIG. 12 is a functional block diagram of an exemplary device 1200 that may be employed within the wireless communication system 100. The device 1200 includes means 1202 for generating a packet for transmission via a wireless signal, where the packet is generated for transmission using at least one OFDM symbol comprising at least 128 tones. In an embodiment, means 1202 for generating a packet for transmission via a wireless signal, where the packet is generated for transmission using at least one OFDM symbol comprising at least 128 tones, may be configured to perform one or more of the functions discussed above with respect to block 1102. The means 1202 for generating may correspond to the processor 204. The device 1200 further includes means 1204 for transmitting the packet via the wireless signal over a channel bandwidth of approximately 500 MHz. In an embodiment, means 1204 for transmitting the packet via the wireless signal over a channel bandwidth of approximately 500 MHz may be configured to perform one or more of the functions discussed above with respect to block 1104. The means 1204 for transmitting may correspond to the transmitter 210.

Figure 13:
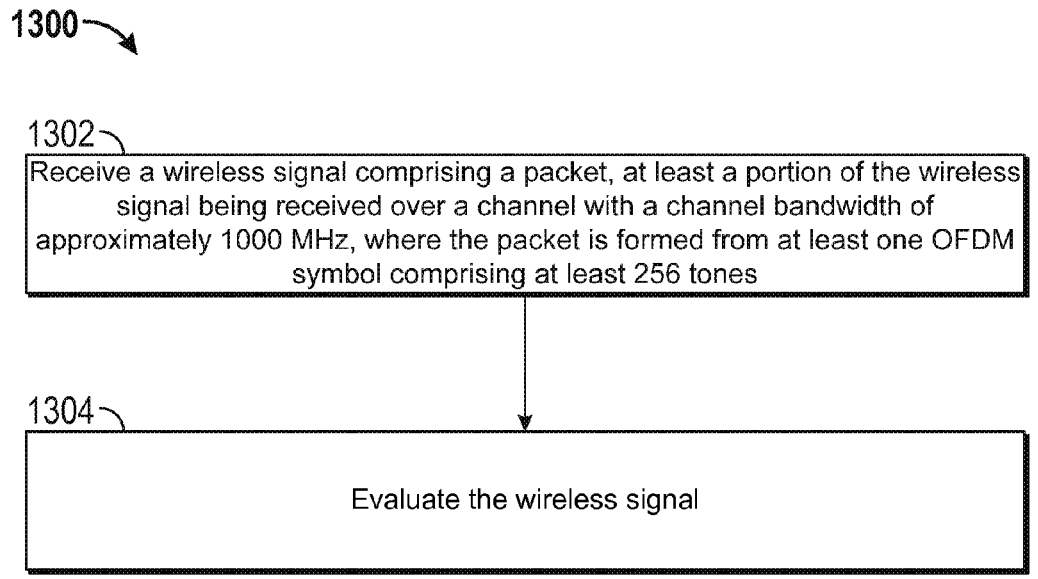
FIG. 13 is another flow chart of an exemplary method for receiving a packet sent via a wireless signal.

FIG. 13 illustrates an aspect of a method 1300 for receiving a packet. The method 1300 may be used to receive any of the packets described above. The packets may be received by either the AP 104 or the STA 106 and transmitted from another node in the wireless network 100. Although the method 1300 is described below with respect to elements of the wireless device 202, those having ordinary skill in the art will appreciate that other components may be used to implement one or more of the steps described herein.

At block 1302, a wireless signal comprising a packet is received. In the aspect illustrated in FIG. 13, at least a portion of the wireless signal is received over a channel with a channel bandwidth of approximately 1000 MHz. The packet may be formed from at least one OFDM symbol comprising at least 256 tones. In an embodiment, the packet further includes a cyclic prefix. In a further embodiment, a duration of the cyclic prefix is a function of the channel bandwidth and is set such that the duration of the cyclic prefix is greater than a delay spread of the channel and delay introduced by front-end processing.

At block 1304, the wireless signal is evaluated. In an embodiment, the at least one OFDM symbol is converted into a frequency domain signal.

Figure 14:
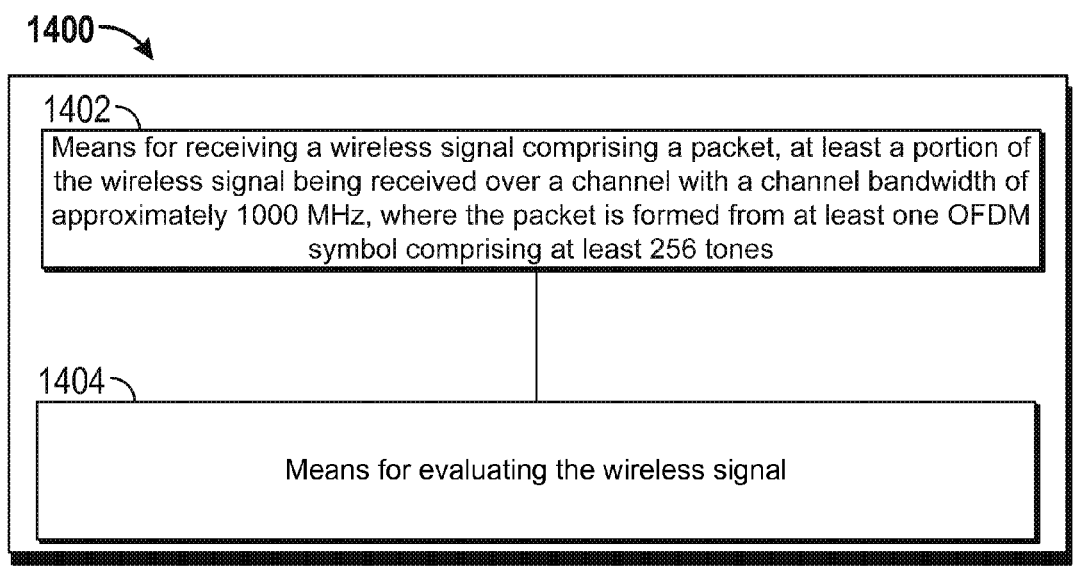
FIG. 14 is another functional block diagram of an exemplary wireless device that may be employed within the wireless communication system of FIG. 1.

FIG. 14 is a functional block diagram of an exemplary device 1400 that may be employed within the wireless communication system 100. The device 1400 includes means 1402 for receiving a wireless signal comprising a packet, at least a portion of the wireless signal being received over a channel bandwidth of approximately 1000 MHz, where the packet is formed from at least one OFDM symbol comprising at least 256 tones. In an embodiment, means 1402 for receiving a wireless signal comprising a packet, at least a portion of the wireless signal being received over a channel bandwidth of approximately 1000 MHz, where the packet is formed from at least one OFDM symbol comprising at least 256 tones, may be configured to perform one or more of the functions discussed above with respect to block 1302. The means 1402 for receiving may correspond to the receiver 212, and may include the amplifier 401. The device 1400 further includes means 1404 for evaluating the wireless signal. In an embodiment, means 1404 for evaluating the wireless signal may be configured to perform one or more of the functions discussed above with respect to block 1304. The means 1404 for evaluating may correspond to the processor 204.

Figure 15:
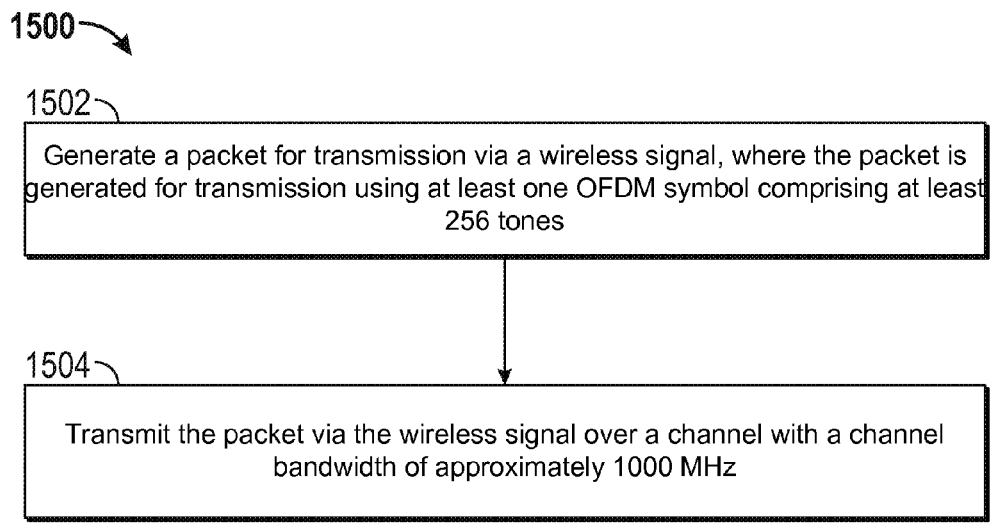
FIG. 15 is another flow chart of an exemplary method for generating and transmitting a packet via a wireless signal.

FIG. 15 illustrates an aspect of a method 1500 for generating and transmitting a packet. The method 1500 may be used to generate and transmit any of the packets described above. The packets may be transmitted from either the AP 104 or the STA 106 and received by another node in the wireless network 100. Although the method 1500 is described below with respect to elements of the wireless device 202, those having ordinary skill in the art will appreciate that other components may be used to implement one or more of the steps described herein.

At block 1502, a packet is generated for transmission via a wireless signal. In the aspect illustrated in FIG. 15, the packet is generated for transmission using at least one OFDM symbol comprising at least 256 tones.

At block 1504, the packet is transmitted via the wireless signal over a channel with a channel bandwidth of approximately 1000 MHz. In an embodiment, the packet further includes a cyclic prefix. In a further embodiment, a duration of the cyclic prefix is a function of the channel bandwidth and is set such that the duration of the cyclic prefix is greater than a delay spread of the channel and delay introduced by front-end processing.

Figure 16:
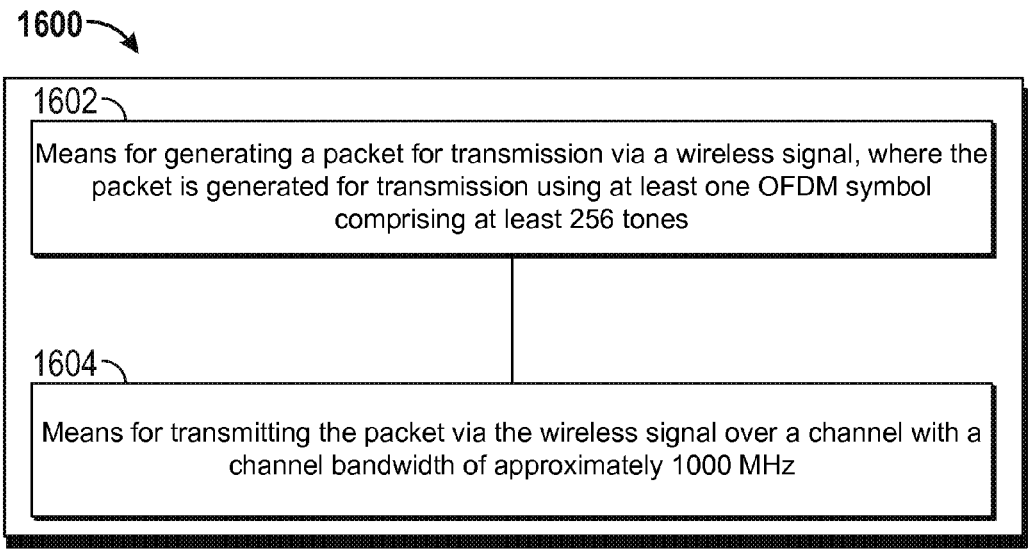
FIG. 16 is another functional block diagram of an exemplary wireless device that may be employed within the wireless communication system of FIG. 1.

FIG. 16 is a functional block diagram of an exemplary device 1600 that may be employed within the wireless communication system 100. The device 1600 includes means 1602 for generating a packet for transmission via a wireless signal, where the packet is generated for transmission using at least one OFDM symbol comprising at least 256 tones. In an embodiment, means 1602 for generating a packet for transmission via a wireless signal, where the packet is generated for transmission using at least one OFDM symbol comprising at least 256 tones, may be configured to perform one or more of the functions discussed above with respect to block 1502. The means 1602 for generating may correspond to the processor 204. The device 1600 further includes means 1604 for transmitting the packet via the wireless signal over a channel bandwidth of approximately 1000 MHz. In an embodiment, means 1604 for transmitting the packet via the wireless signal over a channel bandwidth of approximately 1000 MHz may be configured to perform one or more of the functions discussed above with respect to block 1504. The means 1604 for transmitting may correspond to the transmitter 210.

Figure 17:
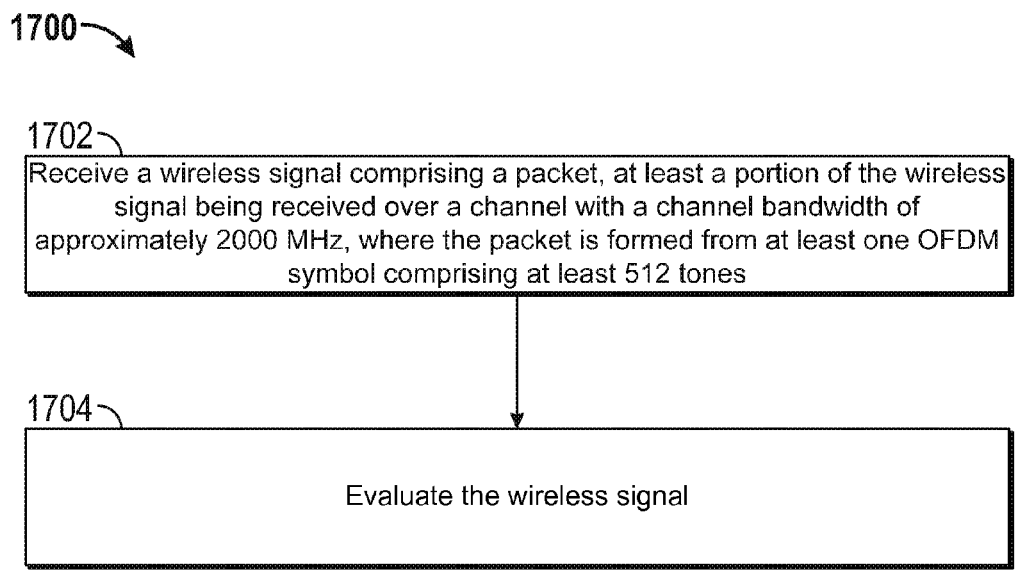
FIG. 17 is another flow chart of an exemplary method for receiving a packet sent via a wireless signal.

FIG. 17 illustrates an aspect of a method 1700 for receiving a packet. The method 1700 may be used to receive any of the packets described above. The packets may be received by either the AP 104 or the STA 106 and transmitted from another node in the wireless network 100. Although the method 1700 is described below with respect to elements of the wireless device 202, those having ordinary skill in the art will appreciate that other components may be used to implement one or more of the steps described herein.

At block 1702, a wireless signal comprising a packet is received. In the aspect illustrated in FIG. 17, at least a portion of the wireless signal is received over a channel with a channel bandwidth of approximately 2000 MHz. The packet may be formed from at least one OFDM symbol comprising at least 512 tones. In an embodiment, the packet further includes a cyclic prefix. In a further embodiment, a duration of the cyclic prefix is a function of the channel bandwidth and is set such that the duration of the cyclic prefix is greater than a delay spread of the channel and delay introduced by front-end processing.

At block 1704, the wireless signal is evaluated. In an embodiment, the at least one OFDM symbol is converted into a frequency domain signal.

Figure 18:
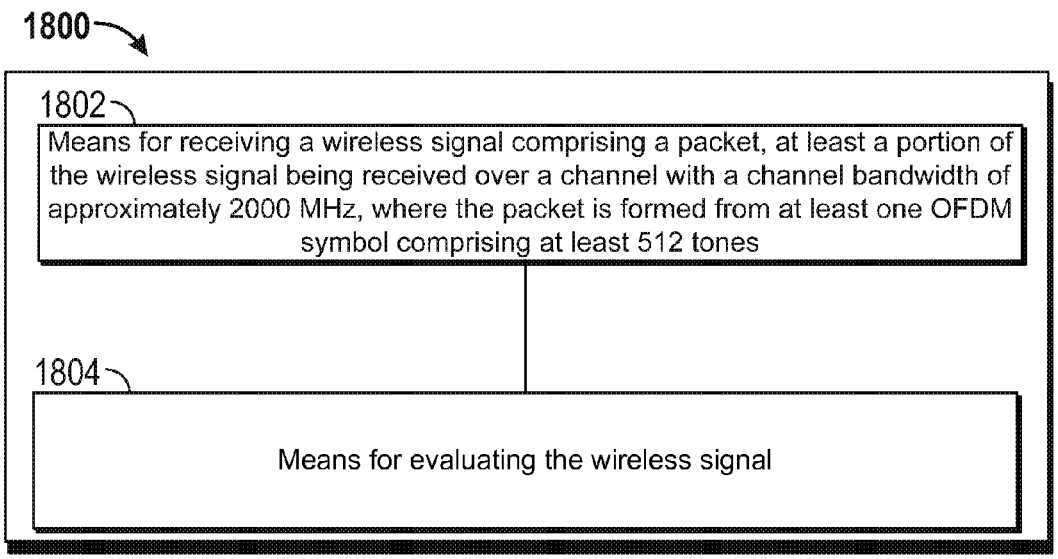
FIG. 18 is another functional block diagram of an exemplary wireless device that may be employed within the wireless communication system of FIG. 1.

FIG. 18 is a functional block diagram of an exemplary device 1800 that may be employed within the wireless communication system 100. The device 1800 includes means 1802 for receiving a wireless signal comprising a packet, at least a portion of the wireless signal being received over a channel bandwidth of approximately 2000 MHz, where the packet is formed from at least one OFDM symbol comprising at least 512 tones. In an embodiment, means 1802 for receiving a wireless signal comprising a packet, at least a portion of the wireless signal being received over a channel bandwidth of approximately 2000 MHz, where the packet is formed from at least one OFDM symbol comprising at least 512 tones, may be configured to perform one or more of the functions discussed above with respect to block 1702. The means 1802 for receiving may correspond to the receiver 212, and may include the amplifier 401. The device 1800 further includes means 1804 for evaluating the wireless signal. In an embodiment, means 1804 for evaluating the wireless signal may be configured to perform one or more of the functions discussed above with respect to block 1704. The means 1804 for evaluating may correspond to the processor 204.

Figure 19:
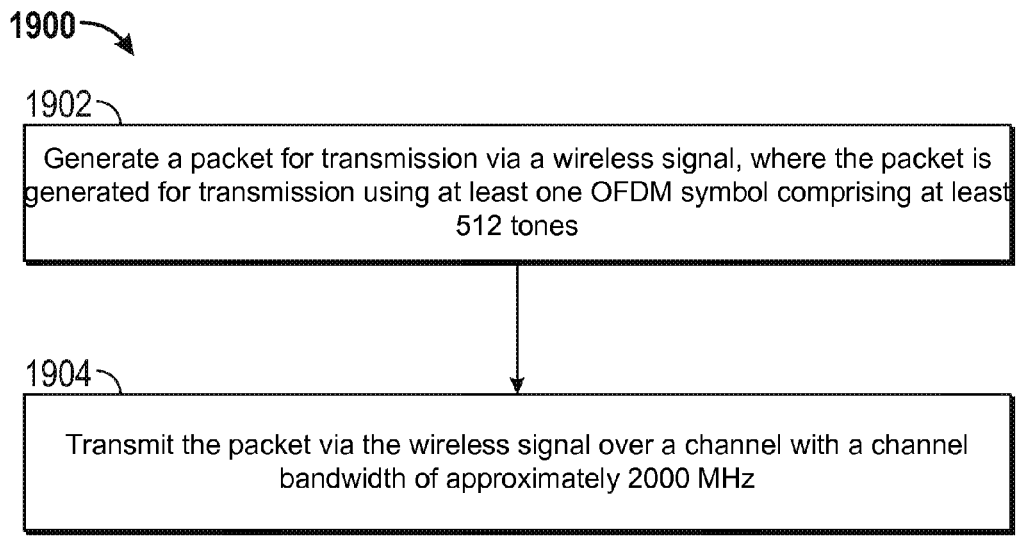
FIG. 19 is another flow chart of an exemplary method for generating and transmitting a packet via a wireless signal.

FIG. 19 illustrates an aspect of a method 1900 for generating and transmitting a packet. The method 1900 may be used to generate and transmit any of the packets described above. The packets may be transmitted from either the AP 104 or the STA 106 and received by another node in the wireless network 100. Although the method 1900 is described below with respect to elements of the wireless device 202, those having ordinary skill in the art will appreciate that other components may be used to implement one or more of the steps described herein.

At block 1902, a packet is generated for transmission via a wireless signal. In the aspect illustrated in FIG. 19, the packet is generated for transmission using at least one OFDM symbol comprising at least 512 tones.

At block 1904, the packet is transmitted via the wireless signal over a channel with a channel bandwidth of approximately 2000 MHz. In an embodiment, the packet further includes a cyclic prefix. In a further embodiment, a duration of the cyclic prefix is a function of the channel bandwidth and is set such that the duration of the cyclic prefix is greater than a delay spread of the channel and delay introduced by front-end processing.

Figure 20:
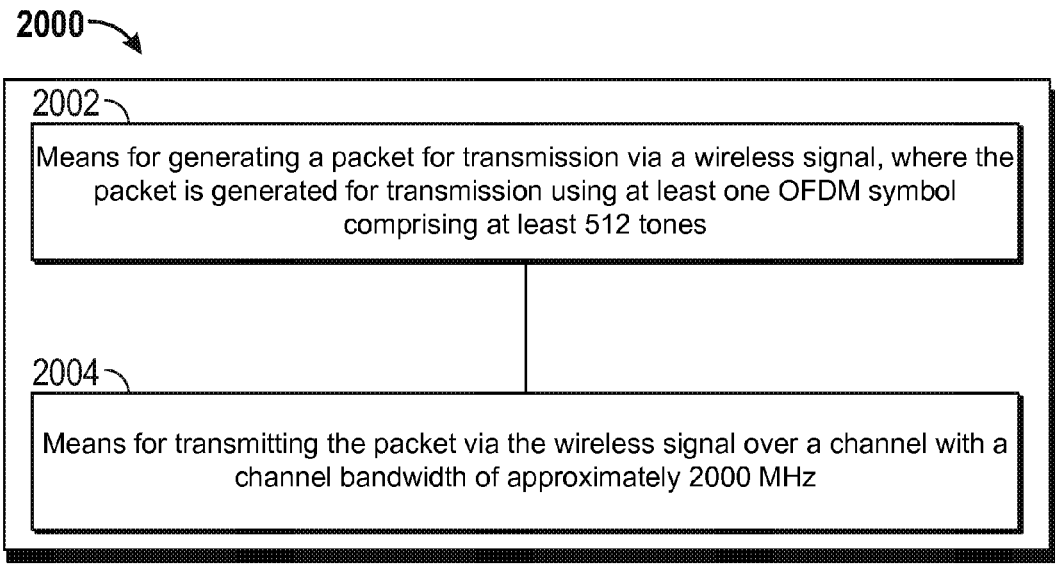
FIG. 20 is another functional block diagram of an exemplary wireless device that may be employed within the wireless communication system of FIG. 1.

FIG. 20 is a functional block diagram of an exemplary device 2000 that may be employed within the wireless communication system 100. The device 2000 includes means 2002 for generating a packet for transmission via a wireless signal, where the packet is generated for transmission using at least one OFDM symbol comprising at least 512 tones. In an embodiment, means 2002 for generating a packet for transmission via a wireless signal, where the packet is generated for transmission using at least one OFDM symbol comprising at least 512 tones, may be configured to perform one or more of the functions discussed above with respect to block 1902. The means 2002 for generating may correspond to the processor 204. The device 2000 further includes means 2004 for transmitting the packet via the wireless signal over a channel bandwidth of approximately 2000 MHz. In an embodiment, means 2004 for transmitting the packet via the wireless signal over a channel bandwidth of approximately 2000 MHz may be configured to perform one or more of the functions discussed above with respect to block 1904. The means 2004 for transmitting may correspond to the transmitter 210.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. An apparatus for wireless communication, comprising:
a receiver, including a filter, configured to receive a wireless signal comprising a packet, at least a portion of the wireless signal being received over a channel with a channel bandwidth of at least approximately five hundred megahertz, wherein the packet is formed from at least one orthogonal frequency-division multiplexing (OFDM) symbol comprising at least one hundred and twenty-eight tones, wherein the packet further includes a cyclic prefix, wherein a duration of the cyclic prefix is a function of the channel bandwidth and is set such that the duration of the cyclic prefix is greater than a delay spread of the channel and delay introduced by front-end processing as determined by the number of taps in the filter's impulse response,
wherein the delay introduced by the front end processing is inversely related to a size of the channel bandwidth; and
a processor configured to evaluate the wireless signal, the processor comprising a transform module configured to convert the at least one OFDM symbol into a frequency domain signal.

2. The apparatus of claim 1, wherein the channel bandwidth is approximately five hundred megahertz, wherein the at least one hundred and twenty-eight tones correspond to frequency subcarriers within the channel bandwidth, wherein the cyclic prefix comprises at least thirty-two tones and a duration of sixty-four nanoseconds when the at least one OFDM symbol comprises at least one hundred and twenty-eight tones, wherein the cyclic prefix comprises at least sixty-four tones and a duration of one hundred and twenty-eight nanoseconds when the at least one OFDM symbol comprises at least two hundred and fifty-six tones, and wherein the cyclic prefix comprises at least sixty-four tones and a duration of one hundred and twenty-eight nanoseconds when the at least one OFDM symbol comprises five hundred and twelve tones.

3. The apparatus of claim 1, wherein the channel bandwidth is approximately one thousand megahertz, wherein the at least one hundred and twenty-eight tones correspond to frequency subcarriers within the channel bandwidth, wherein the cyclic prefix comprises at most sixty-four tones and a duration between forty-eight nanoseconds and fifty-six nanoseconds when the at least one OFDM symbol comprises at least two hundred and fifty-six tones, wherein the cyclic prefix comprises at most one hundred and twenty-eight tones and a duration between one hundred and twelve nanoseconds and one hundred and twenty nanoseconds when the at least one OFDM symbol comprises at least five hundred and twelve tones, and wherein the cyclic prefix comprises at most one hundred and twenty-eight tones and a duration between one hundred and twelve nanoseconds and one hundred and twenty nanoseconds when the at least one OFDM symbol comprises at least one thousand and twenty-four tones.

4. The apparatus of claim 1, wherein the channel bandwidth is approximately two thousand megahertz, wherein the at least one hundred and twenty-eight tones correspond to frequency subcarriers within the channel bandwidth, wherein the cyclic prefix comprises at most one hundred and twenty-eight tones and a duration between thirty nanoseconds and sixty-four nanoseconds when the at least one OFDM symbol comprises at least five hundred and twelve tones, wherein the cyclic prefix comprises at most two hundred and fifty-six tones and a duration between one hundred and four nanoseconds and one hundred and sixteen nanoseconds when the at least one OFDM symbol comprises at least one thousand and twenty-four tones, and wherein the cyclic prefix comprises at most two hundred and fifty-six tones and a duration between one hundred and four nanoseconds and one hundred and sixteen nanoseconds when the at least one OFDM symbol comprises at least two thousand and forty-eight tones.

5. A method for wireless communication, comprising:
receiving, by a receiver including a filter, a wireless signal comprising a packet, at least a portion of the wireless signal being received over a channel with a channel bandwidth of at least approximately five hundred megahertz, wherein the packet is formed from at least one orthogonal frequency-division multiplexing (OFDM) symbol comprising at least one hundred and twenty-eight tones, wherein the packet further includes a cyclic prefix, wherein a duration of the cyclic prefix is a function of the channel bandwidth and is set such that the duration of the cyclic prefix is greater than a delay spread of the channel and delay introduced by front-end processing as determined by the number of taps in the filter's impulse response, wherein the delay introduced by front end processing is inversely related to a size of the channel bandwidth; and
evaluating the wireless signal, the evaluating comprising converting the at least one OFDM symbol into a frequency domain signal.

6. The method of claim 5, wherein the channel bandwidth is approximately five hundred megahertz, wherein the at least one hundred and twenty-eight tones correspond to frequency subcarriers within the channel bandwidth, wherein the cyclic prefix comprises at least thirty-two tones and a duration of sixty-four nanoseconds when the at least one OFDM symbol comprises at least one hundred and twenty-eight tones, wherein the cyclic prefix comprises at least sixty-four tones and a duration of one hundred and twenty-eight nanoseconds when the at least one OFDM symbol comprises at least two hundred and fifty-six tones, and wherein the cyclic prefix comprises at least sixty-four tones and a duration of one hundred and twenty-eight nanoseconds when the at least one OFDM symbol comprises five hundred and twelve tones.

7. The method of claim 5, wherein the channel bandwidth is approximately one thousand megahertz, wherein the at least one hundred and twenty-eight tones correspond to frequency subcarriers within the channel bandwidth, wherein the cyclic prefix comprises at most sixty-four tones and a duration between forty-eight nanoseconds and fifty-six nanoseconds when the at least one OFDM symbol comprises at least two hundred and fifty-six tones, wherein the cyclic prefix comprises at most one hundred and twenty-eight tones and a duration between one hundred and twelve nanoseconds and one hundred and twenty nanoseconds when the at least one OFDM symbol comprises at least five hundred and twelve tones, and wherein the cyclic prefix comprises at most one hundred and twenty-eight tones and a duration between one hundred and twelve nanoseconds and one hundred and twenty nanoseconds when the at least one OFDM symbol comprises at least one thousand and twenty-four tones.

8. The method of claim 5, wherein the channel bandwidth is approximately two thousand megahertz, wherein the at least one hundred and twenty-eight tones correspond to frequency subcarriers within the channel bandwidth, wherein the cyclic prefix comprises at most one hundred and twenty-eight tones and a duration between thirty nanoseconds and sixty-four nanoseconds when the at least one OFDM symbol comprises at least five hundred and twelve tones, wherein the cyclic prefix comprises at most two hundred and fifty-six tones and a duration between one hundred and four nanoseconds and one hundred and sixteen nanoseconds when the at least one OFDM symbol comprises at least one thousand and twenty-four tones, and wherein the cyclic prefix comprises at most two hundred and fifty-six tones and a duration between one hundred and four nanoseconds and one hundred and sixteen nanoseconds when the at least one OFDM symbol comprises at least two thousand and forty-eight tones.

9. An apparatus for wireless communication, comprising:
means for receiving a wireless signal comprising a packet;
means for filtering the wireless signal,
at least a portion of the wireless signal being received over a channel with a channel bandwidth of at least approximately five hundred megahertz, wherein the packet is formed from at least one orthogonal frequency-division multiplexing (OFDM) symbol comprising at least one hundred and twenty-eight tones, wherein the packet further includes a cyclic prefix, wherein a duration of the cyclic prefix is a function of the channel bandwidth and is set such that the duration of the cyclic prefix is greater than a delay spread of the channel and delay introduced by front-end processing as determined by the number of taps of the impulse response associated with the means for filtering, wherein the delay introduced by front end processing is inversely related to a size of the channel bandwidth; and
means for evaluating the filtered wireless signal, wherein the means for evaluating the filtered wireless signal comprises means for converting the at least one OFDM symbol into a frequency domain signal.

10. The apparatus of claim 9, wherein the channel bandwidth is approximately five hundred megahertz, wherein the at least one hundred and twenty-eight tones correspond to frequency subcarriers within the channel bandwidth, wherein the cyclic prefix comprises at least thirty-two tones and a duration of sixty-four nanoseconds when the at least one OFDM symbol comprises at least one hundred and twenty-eight tones, wherein the cyclic prefix comprises at least sixty-four tones and a duration of one hundred and twenty-eight nanoseconds when the at least one OFDM symbol comprises at least two hundred and fifty-six tones, and wherein the cyclic prefix comprises at least sixty-four tones and a duration of one hundred and twenty-eight nanoseconds when the at least one OFDM symbol comprises five hundred and twelve tones.

11. The apparatus of claim 9, wherein the channel bandwidth is approximately one thousand megahertz, wherein the at least one hundred and twenty-eight tones correspond to frequency subcarriers within the channel bandwidth, wherein the cyclic prefix comprises at most sixty-four tones and a duration between forty-eight nanoseconds and fifty-six nanoseconds when the at least one OFDM symbol comprises at least two hundred and fifty-six tones, wherein the cyclic prefix comprises at most one hundred and twenty-eight tones and a duration between one hundred and twelve nanoseconds and one hundred and twenty nanoseconds when the at least one OFDM symbol comprises at least five hundred and twelve tones, and wherein the cyclic prefix comprises at most one hundred and twenty-eight tones and a duration between one hundred and twelve nanoseconds and one hundred and twenty nanoseconds when the at least one OFDM symbol comprises at least one thousand and twenty-four tones.

12. The apparatus of claim 9, wherein the channel bandwidth is approximately two thousand megahertz, wherein the at least one hundred and twenty-eight tones correspond to frequency subcarriers within the channel bandwidth, wherein the cyclic prefix comprises at most one hundred and twenty-eight tones and a duration between thirty nanoseconds and sixty-four nanoseconds when the at least one OFDM symbol comprises at least five hundred and twelve tones, wherein the cyclic prefix comprises at most two hundred and fifty-six tones and a duration between one hundred and four nanoseconds and one hundred and sixteen nanoseconds when the at least one OFDM symbol comprises at least one thousand and twenty-four tones, and wherein the cyclic prefix comprises at most two hundred and fifty-six tones and a duration between one hundred and four nanoseconds and one hundred and sixteen nanoseconds when the at least one OFDM symbol comprises at least two thousand and forty-eight tones.

13. The apparatus of claim 9, wherein the means for receiving comprises a receiver and the means for evaluating comprises a processor.

14. A non-transitory computer-readable medium comprising code that, when executed, causes an apparatus to:
receive, by a receiver including a filter, a wireless signal comprising a packet, at least a portion of the wireless signal being received over a channel with a channel bandwidth of at least approximately five hundred megahertz, wherein the packet is formed from at least one orthogonal frequency-division multiplexing (OFDM) symbol comprising at least one hundred and twenty-eight tones, wherein the packet further includes a cyclic prefix, wherein a duration of the cyclic prefix is a function of the channel bandwidth and is set such that the duration of the cyclic prefix is greater than a delay spread of the channel and delay introduced by front-end processing as determined by the number of taps of the filter's impulse response, wherein the delay introduced by front end processing is inversely related to a size of the channel bandwidth; and
convert the at least one OFDM symbol into a frequency domain signal.

15. The medium of claim 14, wherein the channel bandwidth is approximately five hundred megahertz, wherein the at least one hundred and twenty-eight tones correspond to frequency subcarriers within the channel bandwidth, wherein the cyclic prefix comprises at least thirty-two tones and a duration of sixty-four nanoseconds when the at least one OFDM symbol comprises at least one hundred and twenty-eight tones, wherein the cyclic prefix comprises at least sixty-four tones and a duration of one hundred and twenty-eight nanoseconds when the at least one OFDM symbol comprises at least two hundred and fifty-six tones, and wherein the cyclic prefix comprises at least sixty-four tones and a duration of one hundred and twenty-eight nanoseconds when the at least one OFDM symbol comprises five hundred and twelve tones.

16. The medium of claim 14, wherein the channel bandwidth is approximately one thousand megahertz, wherein the at least one hundred and twenty-eight tones correspond to frequency subcarriers within the channel bandwidth, wherein the cyclic prefix comprises at most sixty-four tones and a duration between forty-eight nanoseconds and fifty-six nanoseconds when the at least one OFDM symbol comprises at least two hundred and fifty-six tones, wherein the cyclic prefix comprises at most one hundred and twenty-eight tones and a duration between one hundred and twelve nanoseconds and one hundred and twenty nanoseconds when the at least one OFDM symbol comprises at least five hundred and twelve tones, and wherein the cyclic prefix comprises at most one hundred and twenty-eight tones and a duration between one hundred and twelve nanoseconds and one hundred and twenty nanoseconds when the at least one OFDM symbol comprises at least one thousand and twenty-four tones.

17. The medium of claim 14, wherein the channel bandwidth is approximately two thousand megahertz, wherein the at least one hundred and twenty-eight tones correspond to frequency subcarriers within the channel bandwidth, wherein the cyclic prefix comprises at most one hundred and twenty-eight tones and a duration between thirty nanoseconds and sixty-four nanoseconds when the at least one OFDM symbol comprises at least five hundred and twelve tones, wherein the cyclic prefix comprises at most two hundred and fifty-six tones and a duration between one hundred and four nanoseconds and one hundred and sixteen nanoseconds when the at least one OFDM symbol comprises at least one thousand and twenty-four tones, and wherein the cyclic prefix comprises at most two hundred and fifty-six tones and a duration between one hundred and four nanoseconds and one hundred and sixteen nanoseconds when the at least one OFDM symbol comprises at least two thousand and forty-eight tones.

18. An apparatus for wireless communication, comprising:
a processor configured to generate a packet for transmission via a wireless signal, wherein the packet is generated for transmission using at least one orthogonal frequency-division multiplexing (OFDM) symbol comprising at least one hundred and twenty-eight tones; and
a transmitter, including a filter, configured to transmit the packet via the wireless signal over a channel with a channel bandwidth of at least approximately five hundred megahertz, wherein the packet further includes a cyclic prefix, wherein a duration of the cyclic prefix is a function of the channel bandwidth and is set such that the duration of the cyclic prefix is greater than a delay spread of the channel and delay introduced by front-end processing as determined by the number of taps of the filter's impulse response, wherein the delay introduced by front end processing is inversely related to a size of the channel bandwidth.

19. The apparatus of claim 18, further comprising a transform module configured to convert the at least one OFDM symbol into a time domain signal using a one hundred and twenty-eight point mode, wherein the channel bandwidth is approximately five hundred megahertz, wherein the at least one hundred and twenty-eight tones correspond to frequency subcarriers within the channel bandwidth, wherein the cyclic prefix comprises at least thirty-two tones and a duration of sixty-four nanoseconds when the at least one OFDM symbol comprises at least one hundred and twenty-eight tones, wherein the cyclic prefix comprises at least sixty-four tones and a duration of one hundred and twenty-eight nanoseconds when the at least one OFDM symbol comprises at least two hundred and fifty-six tones, and wherein the cyclic prefix comprises at least sixty-four tones and a duration of one hundred and twenty-eight nanoseconds when the at least one OFDM symbol comprises five hundred and twelve tones.

20. The apparatus of claim 18, further comprising a transform module configured to convert the at least one OFDM symbol into a time domain signal using a two hundred and fifty-six point mode, wherein the channel bandwidth is approximately one thousand megahertz, wherein the at least one hundred and twenty-eight tones correspond to frequency subcarriers within the channel bandwidth, wherein the cyclic prefix comprises at most sixty-four tones and a duration between forty-eight nanoseconds and fifty-six nanoseconds when the at least one OFDM symbol comprises at least two hundred and fifty-six tones, wherein the cyclic prefix comprises at most one hundred and twenty-eight tones and a duration between one hundred and twelve nanoseconds and one hundred and twenty nanoseconds when the at least one OFDM symbol comprises at least five hundred and twelve tones, and wherein the cyclic prefix comprises at most one hundred and twenty-eight tones and a duration between one hundred and twelve nanoseconds and one hundred and twenty nanoseconds when the at least one OFDM symbol comprises at least one thousand and twenty-four tones.

21. The apparatus of claim 18, further comprising a transform module configured to convert the at least one OFDM symbol into a time domain signal using a five hundred and twelve point mode, wherein the channel bandwidth is approximately two thousand megahertz, wherein the at least one hundred and twenty-eight tones correspond to frequency subcarriers within the channel bandwidth, wherein the cyclic prefix comprises at most one hundred and twenty-eight tones and a duration between thirty nanoseconds and sixty-four nanoseconds when the at least one OFDM symbol comprises at least five hundred and twelve tones, wherein the cyclic prefix comprises at most two hundred and fifty-six tones and a duration between one hundred and four nanoseconds and one hundred and sixteen nanoseconds when the at least one OFDM symbol comprises at least one thousand and twenty-four tones, and wherein the cyclic prefix comprises at most two hundred and fifty-six tones and a duration between one hundred and four nanoseconds and one hundred and sixteen nanoseconds when the at least one OFDM symbol comprises at least two thousand and forty-eight tones.

22. A method for wireless communication, comprising:
generating a packet for transmission via a wireless signal, wherein generating the packet comprises generating the packet for transmission using at least one orthogonal frequency-division multiplexing (OFDM) symbol comprising at least one hundred and twenty-eight tones; and
transmitting, by a transmitter including a filter, the packet via the wireless signal over a channel with a channel bandwidth of at least approximately five hundred megahertz, wherein the packet further includes a cyclic prefix, wherein a duration of the cyclic prefix is a function of the channel bandwidth and is set such that the duration of the cyclic prefix is greater than a delay spread of the channel and delay introduced by front-end processing as determined by the number of taps of the filter's impulse response, wherein the delay introduced by front end processing is inversely related to a size of the channel bandwidth.

23. The method of claim 22, further comprising converting the at least one OFDM symbol into a time domain signal using a one hundred and twenty-eight point mode, wherein the channel bandwidth is approximately five hundred megahertz, wherein the at least one hundred and twenty-eight tones correspond to frequency subcarriers within the channel bandwidth, wherein the cyclic prefix comprises at least thirty-two tones and a duration of sixty-four nanoseconds when the at least one OFDM symbol comprises at least one hundred and twenty-eight tones, wherein the cyclic prefix comprises at least sixty-four tones and a duration of one hundred and twenty-eight nanoseconds when the at least one OFDM symbol comprises at least two hundred and fifty-six tones, and wherein the cyclic prefix comprises at least sixty-four tones and a duration of one hundred and twenty-eight nanoseconds when the at least one OFDM symbol comprises five hundred and twelve tones.

24. The method of claim 22, further comprising converting the at least one OFDM symbol into a time domain signal using a two hundred and fifty-six point mode, wherein the channel bandwidth is approximately one thousand megahertz, wherein the at least one hundred and twenty-eight tones correspond to frequency subcarriers within the channel bandwidth, wherein the cyclic prefix comprises at most sixty-four tones and a duration between forty-eight nanoseconds and fifty-six nanoseconds when the at least one OFDM symbol comprises at least two hundred and fifty-six tones, wherein the cyclic prefix comprises at most one hundred and twenty-eight tones and a duration between one hundred and twelve nanoseconds and one hundred and twenty nanoseconds when the at least one OFDM symbol comprises at least five hundred and twelve tones, and wherein the cyclic prefix comprises at most one hundred and twenty-eight tones and a duration between one hundred and twelve nanoseconds and one hundred and twenty nanoseconds when the at least one OFDM symbol comprises at least one thousand and twenty-four tones.

25. The method of claim 22, further comprising converting the at least one OFDM symbol into a time domain signal using a five hundred and twelve point mode, wherein the channel bandwidth is approximately two thousand megahertz, wherein the at least one hundred and twenty-eight tones correspond to frequency subcarriers within the channel bandwidth, wherein the cyclic prefix comprises at most one hundred and twenty-eight tones and a duration between thirty nanoseconds and sixty-four nanoseconds when the at least one OFDM symbol comprises at least five hundred and twelve tones, wherein the cyclic prefix comprises at most two hundred and fifty-six tones and a duration between one hundred and four nanoseconds and one hundred and sixteen nanoseconds when the at least one OFDM symbol comprises at least one thousand and twenty-four tones, and wherein the cyclic prefix comprises at most two hundred and fifty-six tones and a duration between one hundred and four nanoseconds and one hundred and sixteen nanoseconds when the at least one OFDM symbol comprises at least two thousand and forty-eight tones.

26. An apparatus for wireless communication, comprising:
means for generating a packet for transmission via a wireless signal, wherein the means for generating the packet comprises means for generating the packet for transmission using at least one orthogonal frequency-division multiplexing (OFDM) symbol comprising at least one hundred and twenty-eight tones;
means for filtering the generated packet; and
means for transmitting the filtered packet via the wireless signal over a channel with a channel bandwidth of at least approximately five hundred megahertz, wherein the packet further includes a cyclic prefix, wherein a duration of the cyclic prefix is a function of the channel bandwidth and is set such that the duration of the cyclic prefix is greater than a delay spread of the channel and delay introduced by front-end processing as determined by the number of taps of the impulse response associated with the means for filtering, wherein the delay introduced by front end processing is inversely related to a size of the channel bandwidth.

27. The apparatus of claim 26, further comprising means for converting the at least one OFDM symbol into a time domain signal using a one hundred and twenty-eight point mode, wherein the channel bandwidth is approximately five hundred megahertz, wherein the at least one hundred and twenty-eight tones correspond to frequency subcarriers within the channel bandwidth, wherein the cyclic prefix comprises at least thirty-two tones and a duration of sixty-four nanoseconds when the at least one OFDM symbol comprises at least one hundred and twenty-eight tones, wherein the cyclic prefix comprises at least sixty-four tones and a duration of one hundred and twenty-eight nanoseconds when the at least one OFDM symbol comprises at least two hundred and fifty-six tones, and wherein the cyclic prefix comprises at least sixty-four tones and a duration of one hundred and twenty-eight nanoseconds when the at least one OFDM symbol comprises five hundred and twelve tones.

28. The apparatus of claim 26, further comprising means for converting the at least one OFDM symbol into a time domain signal using a two hundred and fifty-six point mode, wherein the channel bandwidth is approximately one thousand megahertz, wherein the at least one hundred and twenty-eight tones correspond to frequency subcarriers within the channel bandwidth, wherein the cyclic prefix comprises at most sixty-four tones and a duration between forty-eight nanoseconds and fifty-six nanoseconds when the at least one OFDM symbol comprises at least two hundred and fifty-six tones, wherein the cyclic prefix comprises at most one hundred and twenty-eight tones and a duration between one hundred and twelve nanoseconds and one hundred and twenty nanoseconds when the at least one OFDM symbol comprises at least five hundred and twelve tones, and wherein the cyclic prefix comprises at most one hundred and twenty-eight tones and a duration between one hundred and twelve nanoseconds and one hundred and twenty nanoseconds when the at least one OFDM symbol comprises at least one thousand and twenty-four tones.

29. The apparatus of claim 26, further comprising means for converting the at least one OFDM symbol into a time domain signal using a five hundred and twelve point mode, wherein the channel bandwidth is approximately two thousand megahertz, wherein the at least one hundred and twenty-eight tones correspond to frequency subcarriers within the channel bandwidth, wherein the cyclic prefix comprises at most one hundred and twenty-eight tones and a duration between thirty nanoseconds and sixty-four nanoseconds when the at least one OFDM symbol comprises at least five hundred and twelve tones, wherein the cyclic prefix comprises at most two hundred and fifty-six tones and a duration between one hundred and four nanoseconds and one hundred and sixteen nanoseconds when the at least one OFDM symbol comprises at least one thousand and twenty-four tones, and wherein the cyclic prefix comprises at most two hundred and fifty-six tones and a duration between one hundred and four nanoseconds and one hundred and sixteen nanoseconds when the at least one OFDM symbol comprises at least two thousand and forty-eight tones.

30. The apparatus of claim 26, wherein the means for generating comprises a processor, and wherein the means for transmitting comprises a transmitter.

31. A non-transitory computer-readable medium comprising code that, when executed, causes an apparatus to:
generate a packet for transmission via a wireless signal, wherein the packet is generated for transmission using at least one orthogonal frequency-division multiplexing (OFDM) symbol comprising at least one hundred and twenty-eight tones; and
transmit, by a transmitter including a filter, the packet via the wireless signal over a channel with a channel bandwidth of at least approximately five hundred megahertz, wherein the packet further includes a cyclic prefix, wherein a duration of the cyclic prefix is a function of the channel bandwidth and is set such that the duration of the cyclic prefix is greater than a delay spread of the channel and delay introduced by front-end processing as determined by the number of taps of the filter's impulse response, wherein the delay introduced by front end processing is inversely related to a size of the channel bandwidth.

32. The medium of claim 31, further comprising code that, when executed, causes an apparatus to convert the at least one OFDM symbol into a time domain signal using a one hundred and twenty-eight point mode, wherein the channel bandwidth is approximately five hundred megahertz, wherein the at least one hundred and twenty-eight tones correspond to frequency subcarriers within the channel bandwidth, wherein the cyclic prefix comprises at least thirty-two tones and a duration of sixty-four nanoseconds when the at least one OFDM symbol comprises at least one hundred and twenty-eight tones, wherein the cyclic prefix comprises at least sixty-four tones and a duration of one hundred and twenty-eight nanoseconds when the at least one OFDM symbol comprises at least two hundred and fifty-six tones, and wherein the cyclic prefix comprises at least sixty-four tones and a duration of one hundred and twenty-eight nanoseconds when the at least one OFDM symbol comprises five hundred and twelve tones.

33. The medium of claim 31, further comprising code that, when executed, causes an apparatus to convert the at least one OFDM symbol into a time domain signal using a two hundred and fifty-six point mode, wherein the channel bandwidth is approximately one thousand megahertz, wherein the at least one hundred and twenty-eight tones correspond to frequency subcarriers within the channel bandwidth, wherein the cyclic prefix comprises at most sixty-four tones and a duration between forty-eight nanoseconds and fifty-six nanoseconds when the at least one OFDM symbol comprises at least two hundred and fifty-six tones, wherein the cyclic prefix comprises at most one hundred and twenty-eight tones and a duration between one hundred and twelve nanoseconds and one hundred and twenty nanoseconds when the at least one OFDM symbol comprises at least five hundred and twelve tones, and wherein the cyclic prefix comprises at most one hundred and twenty-eight tones and a duration between one hundred and twelve nanoseconds and one hundred and twenty nanoseconds when the at least one OFDM symbol comprises at least one thousand and twenty-four tones.

34. The medium of claim 31, further comprising code that, when executed, causes an apparatus to convert the at least one OFDM symbol into a time domain signal using a five hundred and twelve point mode, wherein the channel bandwidth is approximately two thousand megahertz, wherein the at least one hundred and twenty-eight tones correspond to frequency subcarriers within the channel bandwidth, wherein the cyclic prefix comprises at most one hundred and twenty-eight tones and a duration between thirty nanoseconds and sixty-four nanoseconds when the at least one OFDM symbol comprises at least five hundred and twelve tones, wherein the cyclic prefix comprises at most two hundred and fifty-six tones and a duration between one hundred and four nanoseconds and one hundred and sixteen nanoseconds when the at least one OFDM symbol comprises at least one thousand and twenty-four tones, and wherein the cyclic prefix comprises at most two hundred and fifty-six tones and a duration between one hundred and four nanoseconds and one hundred and sixteen nanoseconds when the at least one OFDM symbol comprises at least two thousand and forty-eight tones.

\* \* \* \* \*